US008010787B2

(12) United States Patent
Matsuoka et al.

(10) Patent No.: US 8,010,787 B2
(45) Date of Patent: Aug. 30, 2011

(54) COMMUNICATION DEVICE, COMMUNICATION LOG TRANSMITTING METHOD SUITABLE FOR COMMUNICATION DEVICE, AND COMMUNICATION SYSTEM

(75) Inventors: Naoki Matsuoka, Kawasaki (JP); Tomohiro Ishihara, Kawasaki (JP); Haruyuki Takeyoshi, Kawasaki (JP); Yoshitoshi Kurose, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 622 days.

(21) Appl. No.: 12/149,254

(22) Filed: Apr. 29, 2008

(65) Prior Publication Data
US 2009/0006839 A1    Jan. 1, 2009

(30) Foreign Application Priority Data

Jun. 29, 2007   (JP) .................................. 2007-173439

(51) Int. Cl.
*H04L 9/00* (2006.01)
(52) U.S. Cl. ............................ 713/160; 380/277; 380/44
(58) Field of Classification Search .................. 380/277, 380/44; 713/160–162, 165–167, 150, 189, 713/193–194; 726/26–27
See application file for complete search history.

(56) References Cited

U.S. PATENT DOCUMENTS
5,237,610 A * 8/1993 Gammie et al. .............. 380/228

FOREIGN PATENT DOCUMENTS
JP    2001-237824    8/2001

* cited by examiner

*Primary Examiner* — Hosuk Song
(74) *Attorney, Agent, or Firm* — Staas & Halsey LLP

(57) ABSTRACT

A communication device collects encrypted packet data passing through the communication device. The communication device extracts parameters required to generate a decryption key used when the collected packet data is decrypted. The communication device notifies a key managing device of the extracted parameters. The communication device acquires the decryption key, generated by the key managing device using the parameters of which notification has been given, from the key managing device. The communication device decrypts the collected packet data using the acquired decryption key and analyzes the decrypted packet data. The communication device extracts profile information from the analyzed packet data. The communication device transmits the extracted profile information and network information related to a network through which the encrypted packet data passes to a communication log device as a communication log.

9 Claims, 22 Drawing Sheets

FIG.5

```
POST / HTTP/1.1
Host: log.server.com
Content-type: application/xml
Content-Length: nnnn <logdata>
   <File>
      <Name>FILE NAME</Name>
      <Level>LEVEL OF IMPORTANCE</Level>
      <type>FILE TYPE</type>
      <ID>0000ABC</ID>
      <USER>Y</USER>
   </File>
   <Network>
      <source>X</source>
      <Destination>Y</Destination>
      <Date>07/10/20T21:42:20</Date>
      <state>pass</state>
      <GW-ID>aaaa</GW-ID>
   </Network>
</logdata>
```

FIG.6

ELECTRONIC FILE DISTRIBUTION LOG ENTRY #1

File
- Name:sample.txt
- Level:3
- type:karte
- USER:Y

Network
- source:X
- Destination:Y
- Date:07/10/20T21:42:20
- GW-ID:aaaa

ELECTRONIC FILE DISTRIBUTION LOG ENTRY #2

File
- Name:sample.txt
- Level:3
- type:karte
- USER:Y

Network
- source:X
- Destination:Y
- Date:07/10/20T21:42:25
- GW-ID:bbbb

⋮

ELECTRONIC FILE DISTRIBUTION LOG ENTRY #N

FIG.12

```
POST / HTTP/1.1
Host: log.server.com
Content-type: application/xml
Content-Length: nnnn <logdata>
 <File>
   <Name>sample.txt</Name>
   <Level>3</Level>
   <type>karte</type>
   <ID>0000ABC</ID>
   <USER>Y</USER>
 </File>
 <Network>
   <source>X</source>
   <Destination>Y</Destination>
   <Date>07/10/20T21:42:20</Date>
   <state>pass</state>
   <GW-ID>aaaa</GW-ID>
 </Network>
 <Others>
   <SN>0</SN>
 </Others>
</logdata>
```

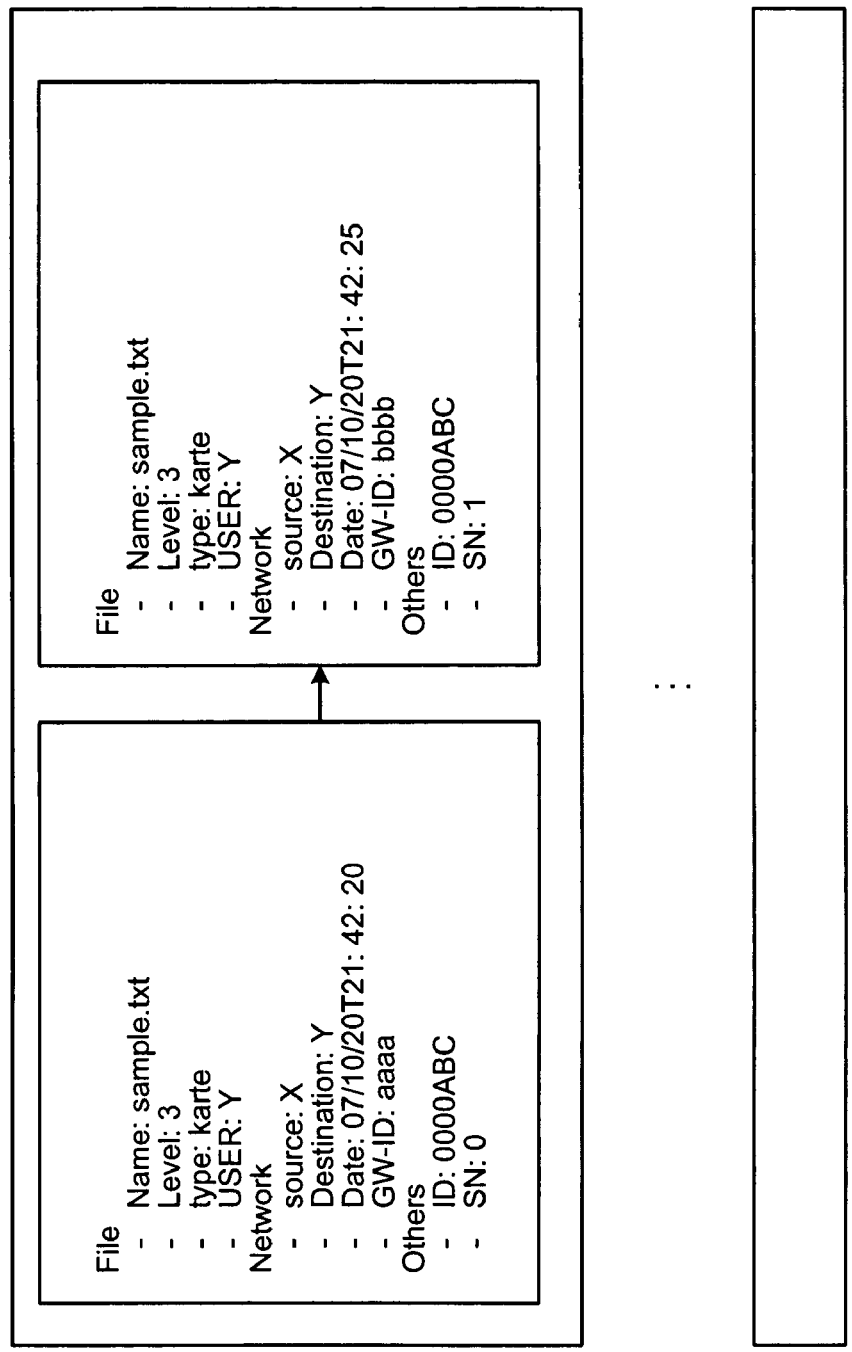

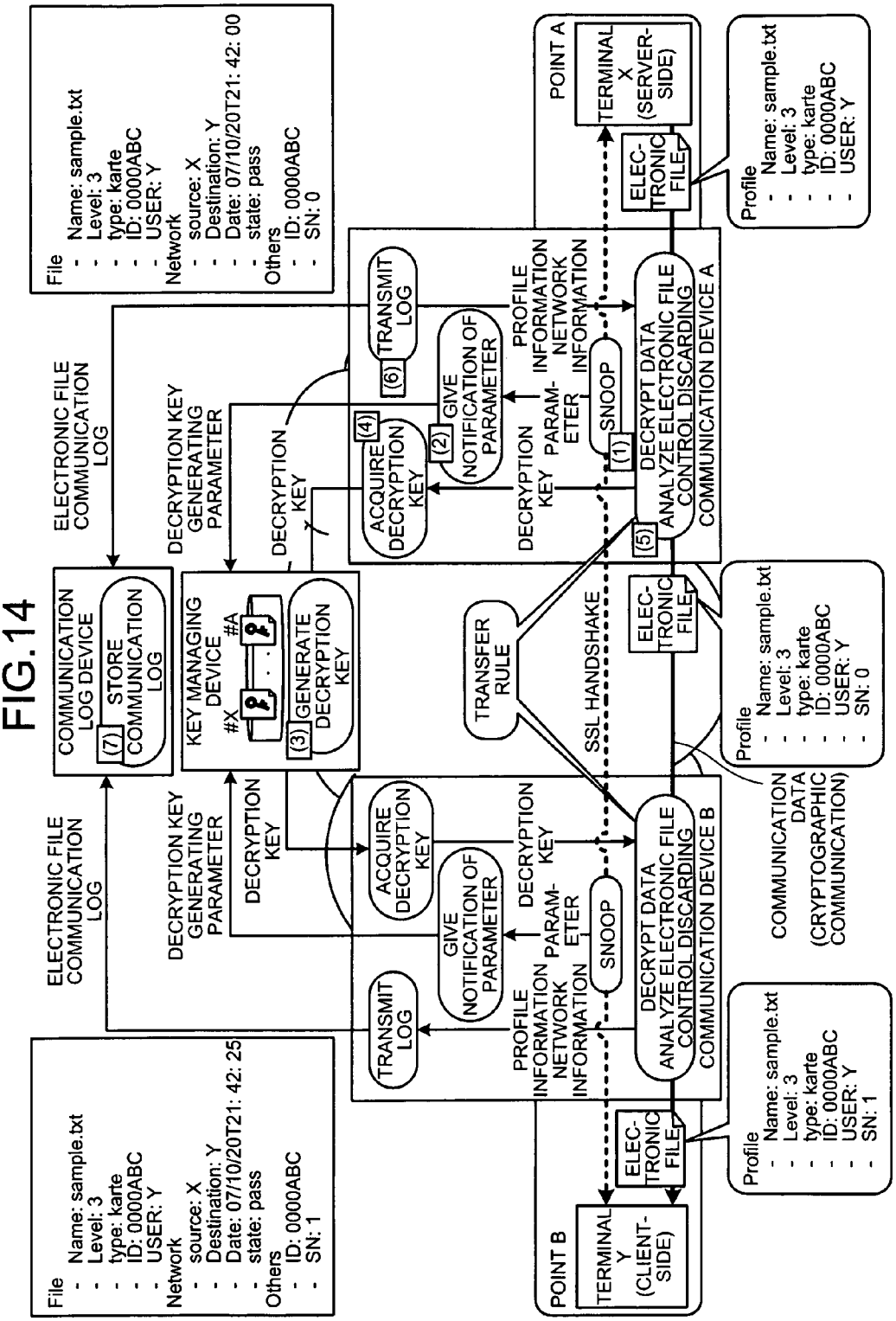

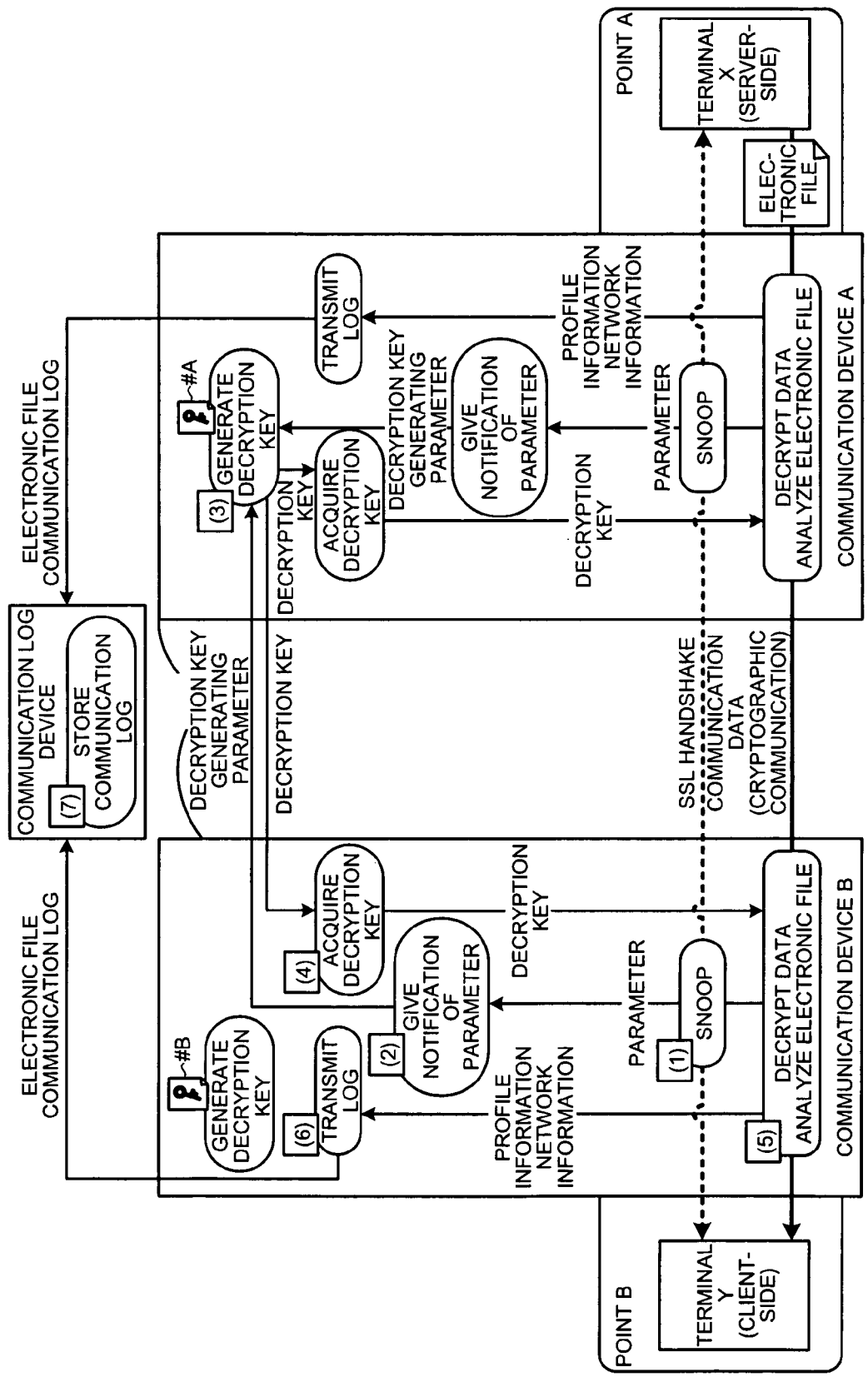

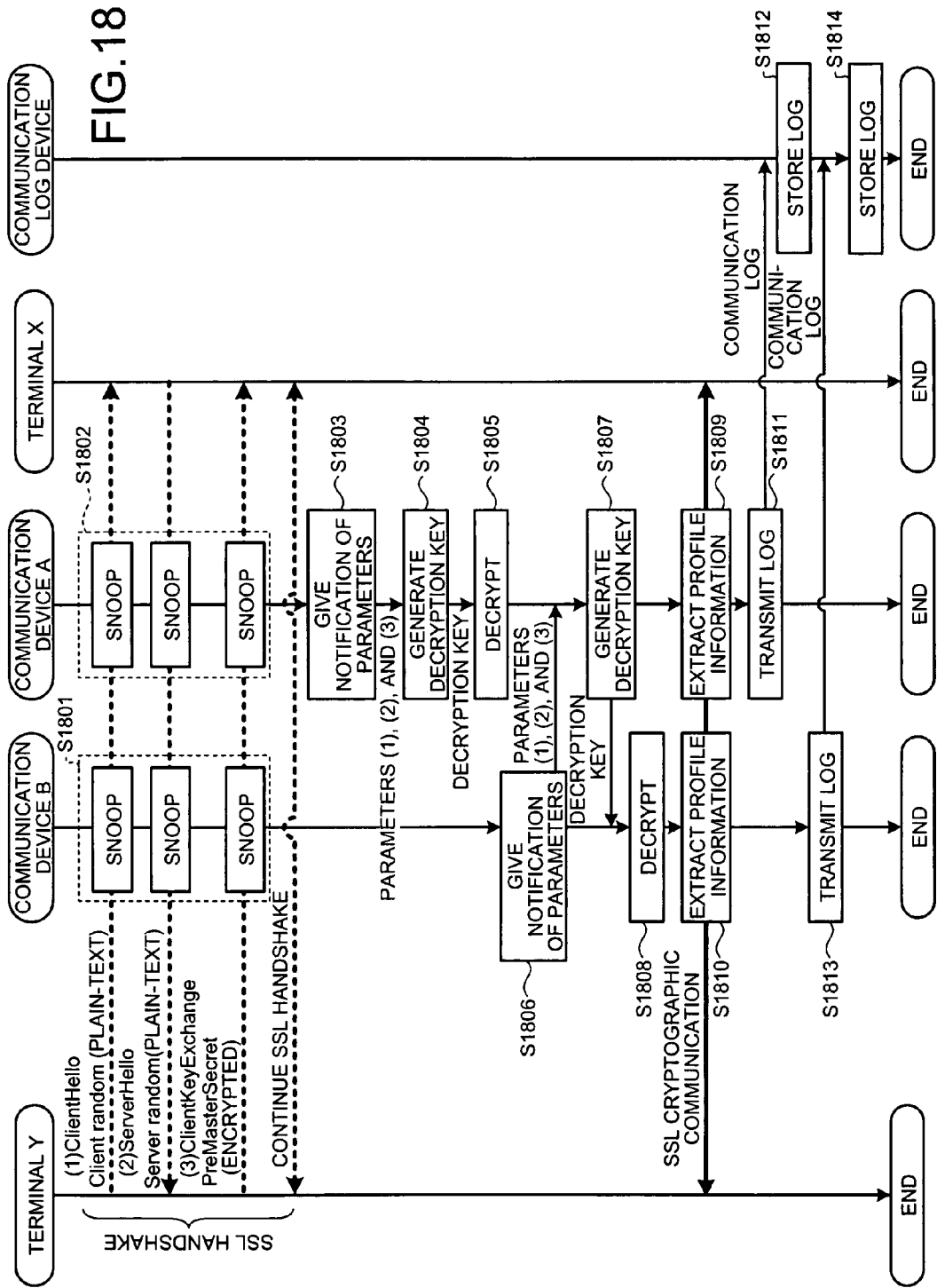

COMMUNICATION DEVICE, COMMUNICATION LOG TRANSMITTING METHOD SUITABLE FOR COMMUNICATION DEVICE, AND COMMUNICATION SYSTEM

BACKGROUND OF THE INVENTION

1. Field of the Invention

The present invention relates to a communication device that is connected to a communication log device that manages communication logs of information transferred over a network, and a key managing device that generates a decryption key used to decrypt encrypted data.

2. Description of the Related Art

Conventionally, there is a system that appropriately operates and manages a server device, a client device, and the like, in which each device collects communication logs. A system manager that operates and manages each device is indispensable for this method. When each device is not appropriately operated and managed, the devices cannot collect the communication logs because of computer virus infection, device failure, and the like. Reliability of the communication logs is lost, particularly in fields requiring exact communication logs.

Therefore, there is a technology in which a network-side takes over storage and management of communication logs. The communication logs indicate information on electronic files transferred over a network and information regarding the network. For example, each communication device deployed in the network collects the communication logs and notifies a log collecting device of the communication logs. The log collecting device performs overall management of the communication logs. However, in this method, each communication device collects the communication logs and gives notification of the communication logs. Therefore, the communication logs can be easily manipulated on each communication device-side. When cryptographic communication is performed over the network, the log collecting device cannot read information in an electronic file of which notification is given because the information is encrypted. As a result, the log collecting device cannot manage communication logs of cryptographic communication.

A following information communication relay device is a system in which encryption is performed between each communication device (refer to Japanese Patent Application Laid-open No. 2001-237824 [pages 10 and 11, and FIG. 1]). The information communication relay device acquires encryption keys from a plurality of connected terminals and holds the acquired encryption keys. The information communication relay device performs encryption and decryption using the held encryption keys. Specifically, when data is exchanged among the connected terminals by cryptographic communication, the information communication relay device decrypts data exchanged through cryptographic communication using an encryption key that is acquired from a transmitting source terminal and held in advance. The information communication relay device then encrypts the decrypted data using an encryption key that is acquired from a transmitting destination terminal and held in advance. The information communication relay device then transmits the encrypted data to the transmitting destination terminal.

Manipulation of logs can also be prevented through use of the technology in Japanese Patent Application Laid-open No. 2001-237824. Specifically, when decrypting the data, the information communication relay device extracts information on the exchanged data and network information related to the network over which the cryptographic communication is performed. The information communication relay device manages the extracted pieces of information as a log. The information communication relay device re-encrypts the decrypted data and transmits the encrypted data to the transmitting destination terminal.

When the communication logs cryptographically communicated over the network are managed using the above-described technology, a secret key for cryptographic communication is distributed to each communication device. A piece of cryptographically communicated data is decrypted through use of the distributed secret key. A communication log of the decrypted data is collected and managed.

However, in the above conventional technology, the secret key is leaked from each communication device, and confidentiality of communication performed by cryptographic communication cannot be maintained. Therefore, the communication logs cannot be safely and accurately collected. Specifically, when the secret key is distributed to each communication device in the network, the secret key leaks from a communication device that is not appropriately operated and managed. Confidentiality of the communication performed by cryptographic communication cannot be maintained. As a result, the communication logs cannot be safely and accurately collected.

SUMMARY OF THE INVENTION

It is an object of the present invention to at least partially solve the problems in the conventional technology.

According to an aspect of the present invention, a communication device is connected to a communication log device that manages a communication log of packet data transferred over a network and a key managing device that generates a decryption key used to decrypt encrypted packet data. The communication device includes a parameter extracting section that collects the encrypted packet data passing through the communication device and extracts parameters required to generate the decryption key used when the collected packet data is decrypted, a parameter notifying section that notifies the key managing device of the parameters extracted by the parameter extracting section, a decryption key acquiring section that acquires the decryption key, generated by the key managing device using the parameters given by the parameter notifying section, from the key managing device, a profile information extracting section that decrypts the collected packet data using the decryption key acquired by the decryption key acquiring section, analyzes the decrypted packet data, and extracts profile information of the analyzed packet data, and a log transmitting section that transmits the profile information extracted by the profile information extracting section and network information related to the network through which the encrypted packet data passes to the communication log device as a communication log.

According to another aspect of the present invention, a method for transmitting a communication log is suitable for a communication device connected to a communication log device that manages a communication log of packet data transferred over a network and a key managing device that generates a decryption key used to decrypt encrypted packet data. The method includes collecting the encrypted packet data passing through the communication device and extracting parameters required to generate the decryption key used when the collected packet data is decrypted, notifying the key managing device of the extracted parameters, acquiring the decryption key, generated by the key managing device using the parameters, from the key managing device, decrypting the collected packet data using the acquired decryption key, analyzing the decrypted packet data, and extracting profile information of the analyzed packet data, and transmitting the extracted profile information and network information related to the network through which the encrypted packet data passes to the communication log device as a communication log.

According to still another aspect of the present invention, a communication system includes a communication log device that manages a communication log of packet data transferred over a network and a key managing device that generates a decryption key used to decrypt encrypted packet data, and a communication device that transmits the communication log to the communication log device. The key managing device includes a secret key storing section that, for each terminal connected to the communication device, stores a secret key used by the terminal, and a decryption key generating and transmitting section that, when parameters required for generating the decryption key are received from the communication device, acquires the secret key of the terminal connected to the communication device from the secret key storing section, generates the decryption key required to decrypt the packet data collected by the communication device using the acquired secret key and the received parameters, and transmits the generated decryption key to the communication device. The communication device includes a parameter extracting section that collects the encrypted packet data passing through the communication device and extracts the parameters from the packet data, a parameter notifying section that notifies the key managing device of the parameters extracted by the parameter extracting section, a decryption key acquiring section that acquires the decryption key, generated by the key managing device using the parameters given by the parameter notifying section, from the key managing device, a profile information extracting section that decrypts the collected packet data using the decryption key acquired by the decryption key acquiring section, analyzes the decrypted packet data, and extracts profile information of the analyzed packet data, and a log transmitting section that transmits the profile information extracted by the profile information extracting section and network information related to the network through which the encrypted packet data passes to the communication log device as a communication log. The communication log device includes a communication log storing section that receives the communication log from the communication device and stores the communication log in a predetermined storage section.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5 is a diagram of an example of a data format of a communication log transmitted from the communication device to a communication log device, according to the first embodiment;

FIG. 6 is a diagram of an example of a log management table of a communication log device in the system including the communication device according to the first embodiment;

FIG. 12 is a diagram of an example of a data format of a communication log transmitted from the communication device to a communication log device, according to the second embodiment;

FIG. 13 is a diagram of an example of a log management table of a communication log device in the system including the communication device according to the second embodiment;

FIG. 14 is a diagram of an overall configuration of a system including a communication device according to a third embodiment of the present invention;

FIG. 17 is a diagram of an overall configuration of a system including a communication device according to a fourth embodiment of the present invention;

FIG. 18 is a diagram of a control sequence of a communication log transmitting process performed by the system including the communication device according to the fourth embodiment;

DETAILED DESCRIPTION OF THE PREFERRED EMBODIMENTS

Exemplary embodiments of the present invention are below described with reference to the attached drawings.

Hereafter, an overview and characteristics of a communication device, a communication log transmitting method suitable for the communication device, and a communication system of the present invention, a configuration of the communication device, and a flow processes performed by the communication device will be sequentially described. Advantageous effects according to the embodiments will be described last.

Figure 1:
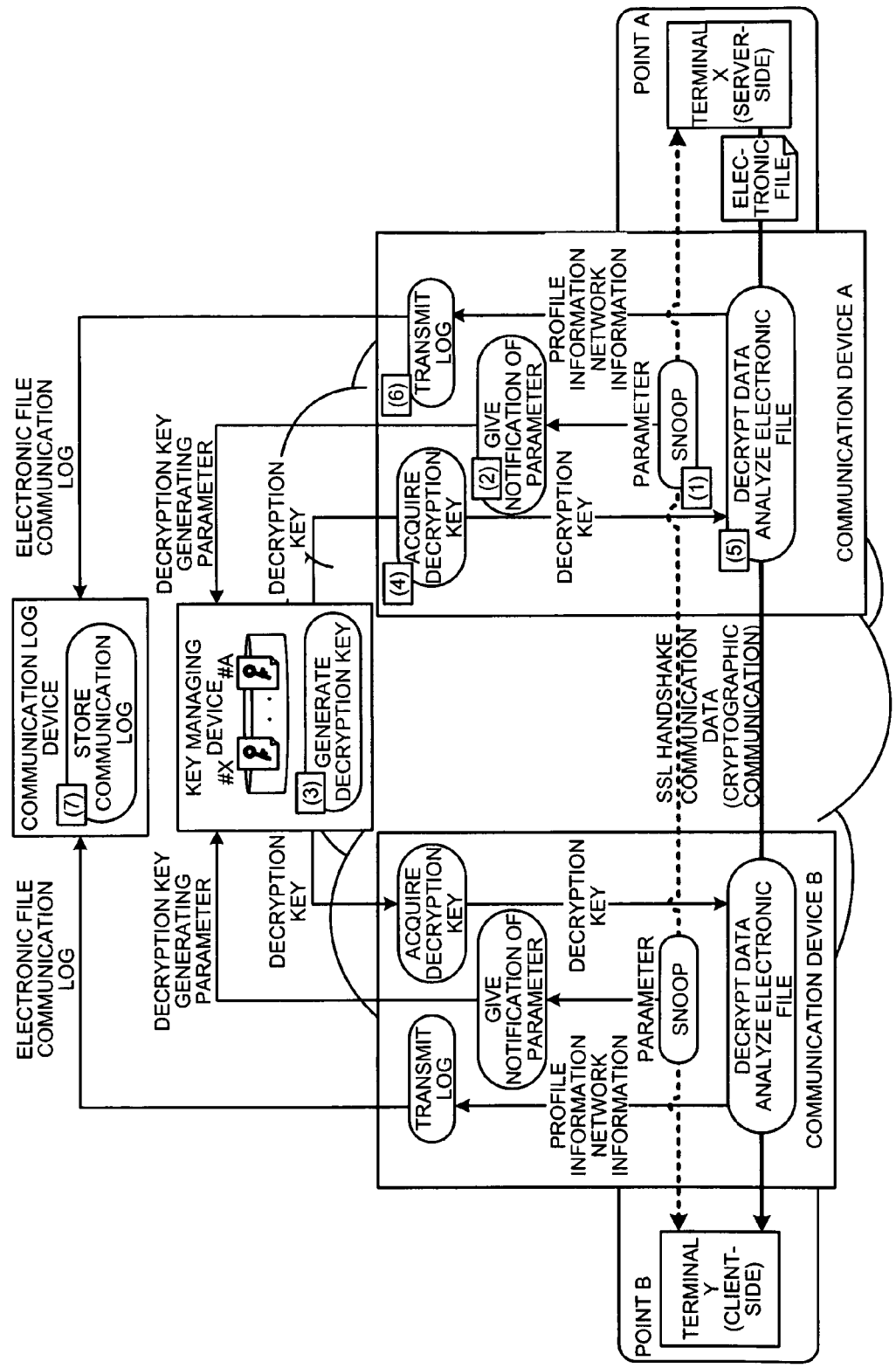
FIG. 1 is a diagram of an overview and characteristics of an overall system including a communication device according to a first embodiment of the present invention.

First, an overview and characteristics of an overall system including a communication device according to a first embodiment will be described with reference to FIG. 1. FIG. 1 is a diagram of the overview and characteristics of the overall system including the communication device according to the first embodiment.

The system including the communication device includes a communication device A, a communication device B, a key managing device, and a communication log device. The communication device A is connected to a terminal X at a point A. The communication device B is connected to a terminal Y at a point B. The terminal X and the terminal Y are connected such that cryptographic communication can be performed therebetween.

For example, before transmitting an encrypted packet data, such as an electronic file, to the terminal Y at the point B, via the communication device A and the communication device B, the terminal X at the point A establishes an SSL (Secure Socket Layer) handshake. Same public key equivalents are held between the terminal X and the terminal Y as a result of the SSL handshake. When the SSL handshake is established, the terminal X transmits the encrypted packet data, such as the electronic file, to the terminal Y at the point B, via the communication device A and the communication device B. The key managing device holds a "secret key #A" of the terminal X at the point A and a "secret key #A" of the terminal Y at the point B. The key managing device generates a decryption key corresponding to each terminal. The communication log device stores communication logs of communication exchanged between the terminal X and the terminal Y in a predetermined storage section and performs overall management of the communication logs. In this embodiment, the terminal X transmits data to the terminal Y.

In a configuration such as that above, the communication device A reciprocally communicates with the communication log device and the key managing device, via a network. In particular, a main characteristic of the communication device A is that logs of cryptographic communication and network information can be safely and accurately collected without a secret key being distributed to each communication device.

The main characteristic is described as follows. When an encrypted packet data, such as an electronic file, is transmitted from the terminal X at the point A to the terminal Y at the point B, the communication device A collects the encrypted packet data passing through the communication device A. The communication device A then extracts parameters required to generate a decryption key used to decrypt the collected packet data (see (1) in FIG. 1).

Specifically, before the encrypted packet data, such as the electronic file, is transmitted from the terminal X at the point A to the terminal Y at the point Y, the SSL handshake is established. Through the SSL handshake, control-related information, such as a method and protocol for performing communication between the terminal X and the terminal Y, is exchanged in advance. When the encrypted packet data is transmitted, the communication device A collects the encrypted packet data and extracts a plain-text "Client Random" parameter, a "Server Random" parameter, and a "PreMaster Secret" parameter that are exchanged during the SSL handshake. The "PreMaster Secret" parameter is encrypted by a public key of the terminal X.

Then, the communication device A notifies the key managing device of the extracted parameters (see (2) in FIG. 1). The notification is described in detail as follows, using the above-described example. The communication device A notifies the key managing device of the extracted plain-text "Client Random" parameter, the "Server Random" parameter, and the "PreMaster Secret" parameter encrypted by a public key of the terminal X. The key managing device holds the "secret key #A" of the terminal X at the point A.

The key managing device that receives the notification of the parameters from the communication device A generates a decryption key using the parameters of which the notification has been received and the "secret key #A" (see (3) in FIG. 1). Specifically, in the above-described example, the key managing device decrypts the "PreMaster Secret" parameter of which the notification has been received using the "secret key #A" of the terminal X held by the key managing device. The key managing device generates a "decryption key #AA" from information that is the decrypted "PreMaster Secret" parameter, the "Client Random" parameter, and the "Server Random" parameter, in adherence to a calculation formula (refer to Section 6.3 of RFC 2246 by T. Dierks et al., The TLS Protocol Version 1.0, http://www.ietf.org/rfc/rfc2246.txt).

Next, the communication device A acquires the decryption key, generated by the key managing device using the parameters of which the notification has been received, from the key managing device (see (4) in FIG. 1). Specifically, the communication device A receives the "decryption key #AA" generated by the key managing device using cryptographic communication, such as SSL or Security Architecture for Internet Protocol (IPSec). The "decryption key #AA" is valid only during a session between the communication device A and the key managing device. The "decryption key #AA" becomes invalid when the session ends.

Next, the communication device A decrypts the collected packet data using the acquired decryption key and analyzes the decrypted packet data. The communication device A then extracts profile information of the analyzed packet data (see (5) in FIG. 1). Specifically, the communication device A decrypts the collected packet data using the decryption key received from the key managing device and analyzes the decrypted packet data. The communication device A then extracts the profile information, such as "packet data name, level of importance, type, and user information".

The communication device A then transmits the extracted profile information and network information related to the network through which the encrypted packet data passes to the communication log device as a communication log. The communication log device stores the transmitted communication log in the predetermined storage section (see (6) and (7) in FIG. 1).

Specifically, the communication device A transmits the extracted profile information, such as the "packet data name, level of importance, type, and user information", and the network information, such as "packet data transmitting source, packet data transmitting destination, and passage time at which the packet data passes through the communication device A" to the communication log device as the communication log. The communication device A collects the network information when the encrypted packet data passes through the communication device A. The communication log device then stores the profile information and the network information transmitted from the communication device A in the predetermined storage section as the communication log. Same processes as those performed by the communication device A are performed by the communication device B. The communication device B transmits collected profile information and network information to the communication log device as a communication log.

In this way, when cryptographic communication is performed over the network, the communication device according to the first embodiment can decrypt the encrypted packet data using the decryption key generated from the parameters extracted from the encrypted packet data. The communication device can analyze the decrypted packet data and transmit the profile information and the network information to the communication log device as the communication log. As a result, as in the above-described main characteristic, the logs of cryptographic communication and network information can be safely and accurately collected without the secret key being distributed to each communication device.

Figure 2:
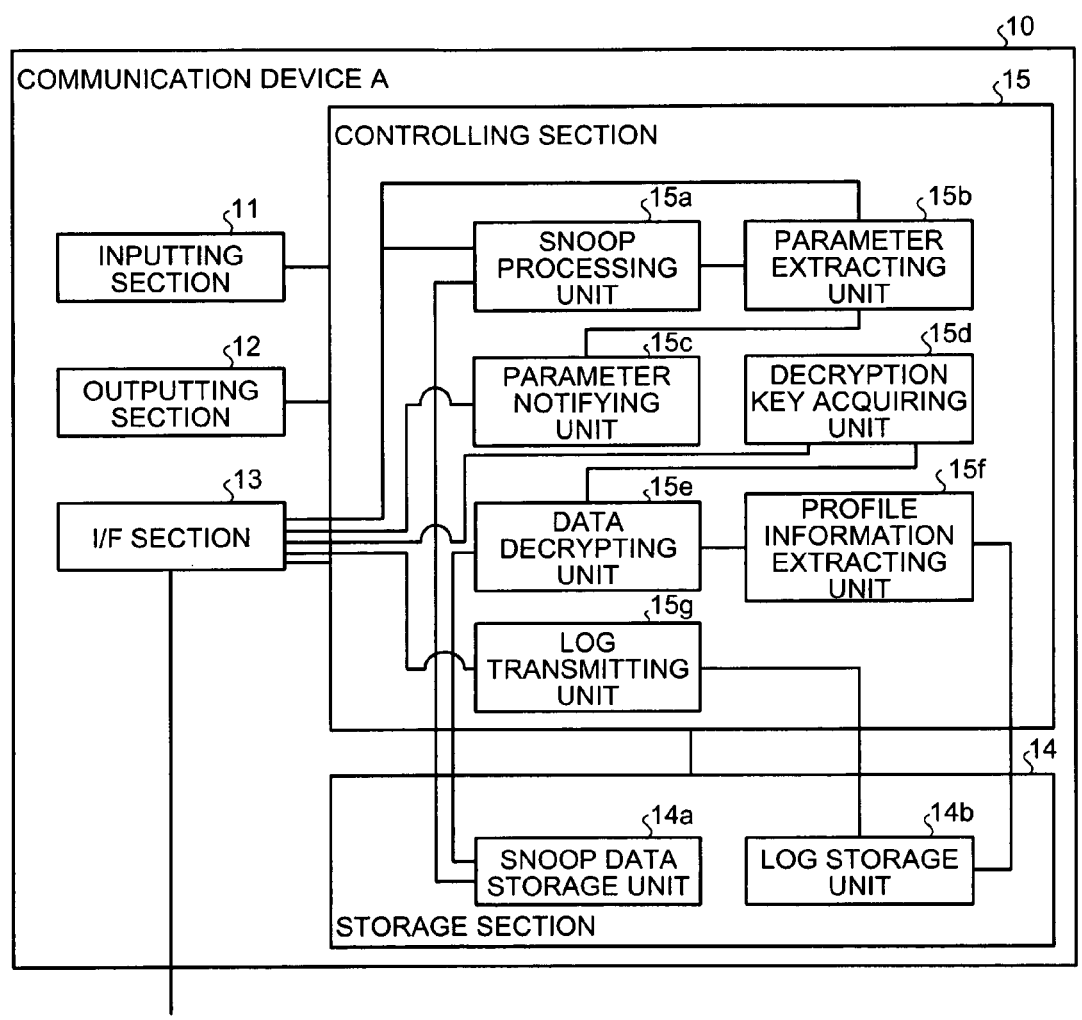
FIG. 2 is a block diagram of a configuration of a communication device in the system according to the first embodiment.

Next, a block diagram of a configuration of the communication device A in FIG. 1 will be described with reference to FIG. 2. FIG. 2 is the block diagram of the configuration of the communication device A in the system according to the first embodiment. The communication device A and the communication device B have the same configuration. Therefore, the communication device A will be described herein. As shown in FIG. 2, a communication device A 10 includes an inputting section 11, an outputting section 12, an interface (I/F) section 13, a storage section 14, and a controlling section 15. According to the first embodiment, when the terminal X transmits data to the terminal Y, via the communication device A 10, will be described.

The inputting section 11 and the outputting section 12 are interfaces allowing parameter settings and references to be externally performed. For example, parameters are set and setting values are referenced from a remote terminal through use of CLI (Command Line Interface), using a protocol such as TELNET (Telecommunication Network) and SSH (Secure Shell). For example, when the communication device A has a simple web server function, parameter settings and references can be performed through a web browser.

The I/F section 13 is connected to the network and controls communication related to various information acquired over the network. For example, the I/F section 13 transmits and receives packet data exchanged via the communication device A 10 and transmits a collected communication log to the communication log device.

The storage section 14 stores data required by the controlling section 15 to perform various processes and various process results from the controlling section 15. In particularly close relation to the present invention, the storage section 14 includes a snoop data storage unit 14a and a log storage unit 14b.

The snoop data storage unit 14a stores packet data collected by the controlling section 15, described hereafter. The log storage unit 14b stores communication logs collected by the controlling section 15, described hereafter. The packet data and the communication logs can be temporarily stored and periodically deleted.

The controlling section 15 has an internal memory storing control programs such as an operating system (OS), programs prescribing various processing procedures and the like, and required data. In particularly close relation to the present invention, the controlling section 15 includes a snoop processing unit 15a, a parameter extracting unit 15b, a parameter notifying unit 15c, a decryption key acquiring unit 15d, a data decrypting unit 15e, a profile information extracting unit 15f, and a log transmitting unit 15g. The snoop processing unit 15a, the parameter extracting unit 15b, the parameter notifying unit 15c, the decryption key acquiring unit 15d, the data decrypting unit 15e, the profile information extracting unit 15f, and the log transmitting unit 15g perform various processes.

The snoop processing unit 15a collects encrypted packet data passing through the communication device. A following specific example is given. Before the packet data, such as the electronic file, is exchanged between the communication device A and the communication device B, the SSL handshake is established. Through the SSL handshake, control-related information, such as the method and protocol for performing communication is exchanged in advance. When the encrypted packet data, such as the electronic file, is exchanged via the communication device A 10, the snoop processing unit 15a collects the packet data entered into the I/F section 13 and stores the collected packet data in the snoop data storage unit 14a.

The parameter extracting unit 15b extracts parameters that are required to generate the decryption key used when the encrypted packet data collected by the snoop processing unit 15a is decrypted. A following specific example is given. The parameter extracting unit 15b extracts the plain-text "Client Random" parameter, the "Server Random" parameter, and the encrypted "PreMaster Secret" parameter that are exchanged during the SSL handshake. The parameters are required to generate the decryption key used when the encrypted packet data collected by the snoop processing unit 15a is decrypted. The parameter extracting unit 15b then notifies the parameter notifying unit 15c, described hereafter, of the extracted parameters. The snoop processing unit 15a and the parameter extracting unit 15b correspond with a "parameter extracting section" of the present invention.

The parameter notifying unit 15c notifies the key managing device of the parameters extracted by the parameter extracting unit 15b. A following specific example is given. When the parameter notifying unit 15c receives the notification of the plain-text "Client Random" parameter, the "Server Random" parameter, and the encrypted "PreMaster Secret" parameter that are the parameters extracted by the parameter extracting unit 15b, the parameter notifying unit 15c notifies the key managing device of the parameters of which the notification has been received. The key managing device generates the decryption key used to decrypt the encrypted packet data. The key managing device generates the "decryption key #AA" using the parameters of which the notification has been received and the "secret key #A" held in advance. The key managing device then transmits the generated "decryption key #AA" to the communication device A. The parameter notifying unit 15c corresponds with a "parameter notifying section" of the present invention.

The decryption key acquiring unit 15d acquires the decryption key from the key managing device. The decryption key is generated by the key managing device using the parameters of which the notification has been given by the parameter notifying unit 15c. A following specific example is given. The decryption key acquiring unit 15d acquires the "decryption key #AA" generated by the key managing device and transmits the acquired "decryption key #AA" to the data decrypting unit 15e, described hereafter. The decryption key acquiring unit 15d corresponds with a "decryption key acquiring section" of the present invention.

The data decrypting unit 15e decrypts the collected encrypted packet data using the decryption key acquired by the decryption key acquiring unit 15d. Specifically, When the "decryption key #AA" is transmitted from the decryption key acquiring unit 15d, the data decrypting unit 15e decrypts the encrypted packet data stored in the snoop data storage unit 14a using the transmitted "decryption key #AA". After decrypting the encrypted packet data, the data decrypting unit 15e then notifies the profile information extracting unit 15f, described hereafter, that the encrypted packet data has been decrypted.

The profile information extracting unit 15f analyzes the packet data decrypted by the data decrypting unit 15e and extracts the profile information of the analyzed packet data. A following specific example is given. When the data decrypting unit 15e notifies the profile information extracting unit 15f that the encrypted packet data has been decrypted, the profile information extracting unit 15f analyzes the packet data decrypted by the data decrypting unit 15e. The profile information extracting unit 15f extracts the profile information, such as the "packet data name, level of importance, type, and user information". The profile information extracting unit 15f then stores the extracted profile information in the log storage unit 14b as the communication log. The data decrypting unit 15e and the profile information extracting unit 15f correspond with a "profile information extracting section" of the present invention.

The log transmitting unit 15g transmits the profile information extracted by the profile information extracting unit 15f and the network information related to the network through which the encrypted packet data passes to the communication log device as the communication log. A following specific example is given. The log transmitting unit 15g transmits the profile information, such as the "packet data name, level of importance, type, and user information", stored in the log storage unit 14b by the profile information extracting unit 15f and the network information related to the network, such as the "passage time, packet data transmitting source, and packet data transmitting destination", acquired when the packet data passes through the communication device A 10 to the communication log device as the communication log. The log transmitting unit 15g corresponds with a "log transmitting section" of the present invention.

Figure 3:
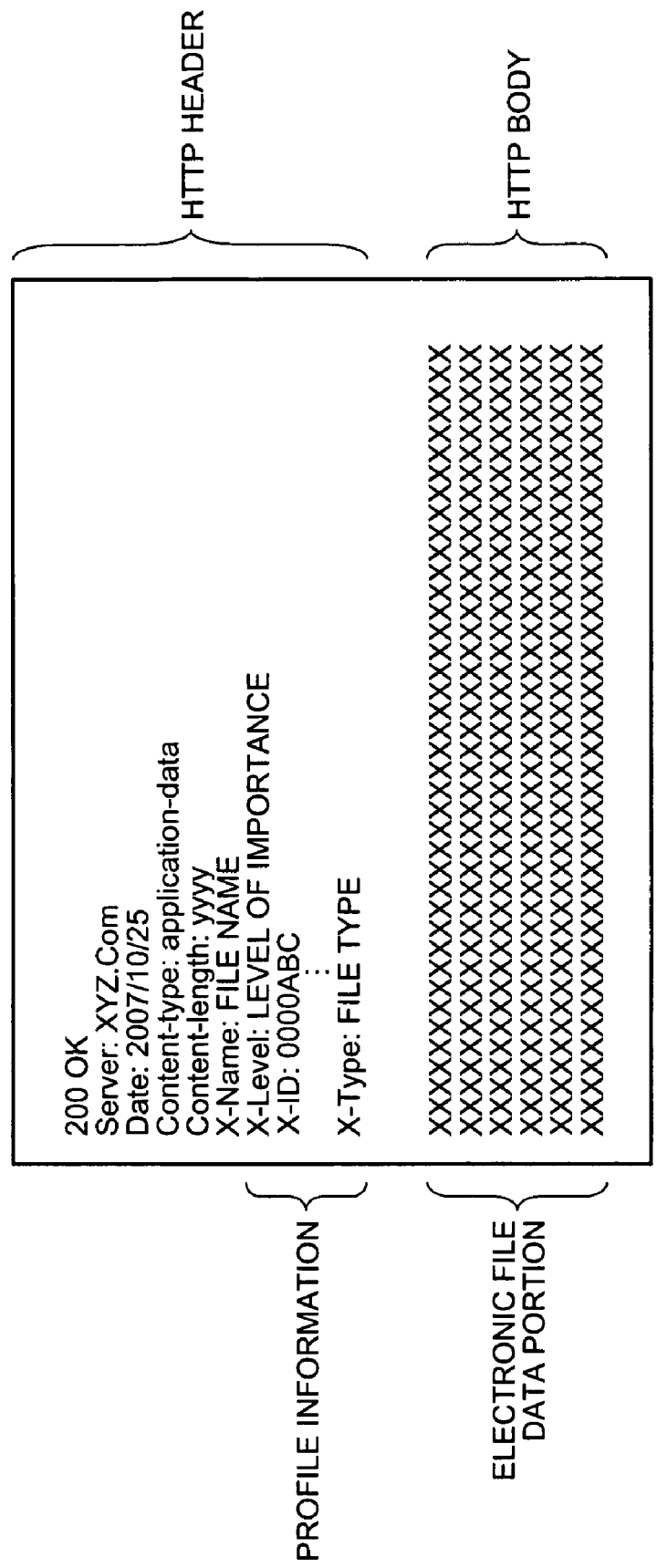
FIG. 3 is a diagram of an example of a data format of contents transmitted from a server to a client terminal when HTTP is used, according to the first embodiment.
Figure 4:
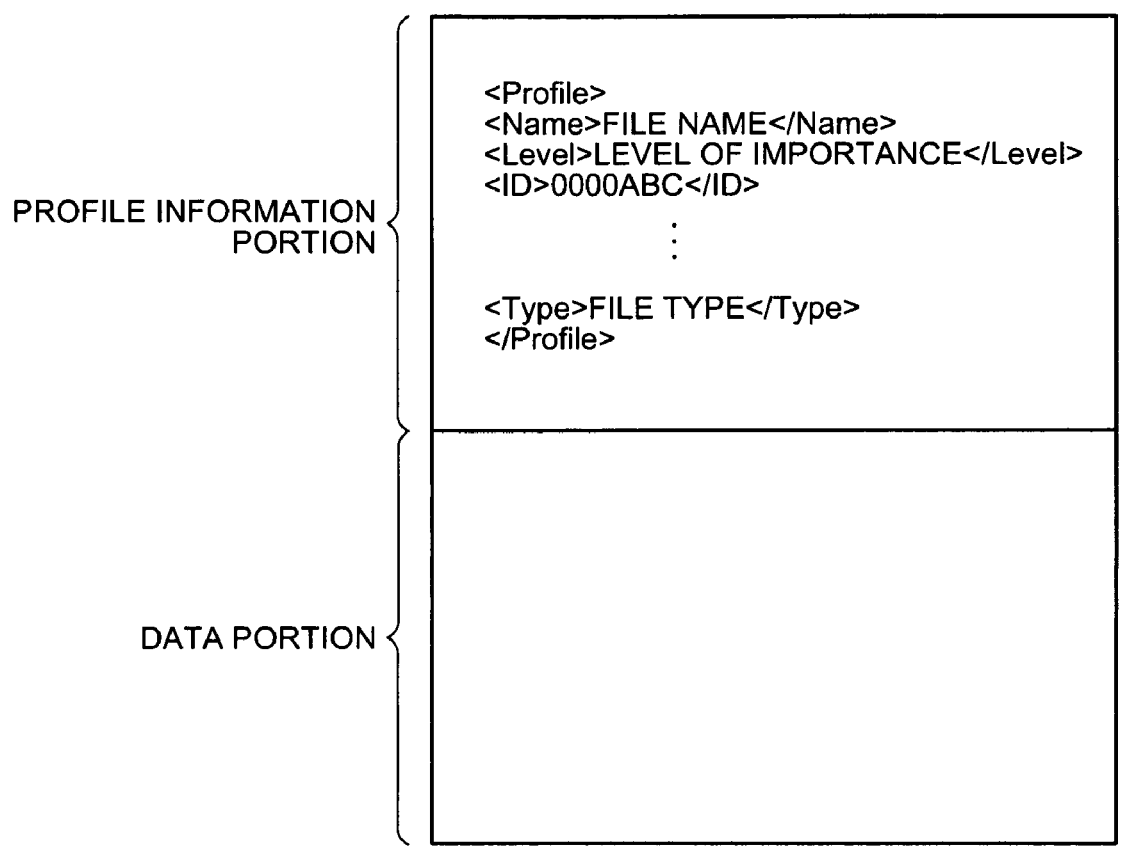
FIG. 4 is a diagram of an example of a data format of contents transmitted from the server to the client terminal when HTTP/FTP is used, according to the first embodiment.

For example, when the communication device A 10 transmits the electronic file to the communication device B using hypertext transfer protocol (HTTP), the communication device A 10 transmits the electronic file using a data format such as that shown in FIG. 3. The profile information is stored in an HTTP header area of the HTTP. For example, when the communication device A 10 transmits the electronic file to the communication device B using HTTP/file transfer protocol (FTP), the communication device A 10 transmits the electronic file using a data format such as that shown in FIG. 4. The profile information is integrated with electronic file data. For example, when the communication device A 10 transmits the communication log to the communication log device, the communication device A 10 transmits the communication log using a data format such as that shown in FIG. 5. In this way, the communication device A can transmit required data even when communication methods differ, such as HTTP and FTP. FIG. 3 is a diagram of an example of a data format of contents transmitted from a server to a client terminal when HTTP is used, according to the first embodiment. FIG. 4 is a diagram of an example of a data format of contents transmitted from a server to a client terminal when HTTP/FTP is used, according to the first embodiment. FIG. 5 is a diagram of an example of a data format of the communication log transmitted from the communication device to the communication log device, according to the first embodiment.

After receiving the profile information and the network information such as those shown in FIG. 6, the communication log device stores the received profile information and network information in a predetermined storage section, such as a log management table. The communication log device sequentially stores the profile information and the network information in order of the passage time at which the packet data passes through the communication device A 10. FIG. 6 is a diagram of an example of the log management table of the communication log device in the system including the communication device according to the first embodiment.

Figure 7:
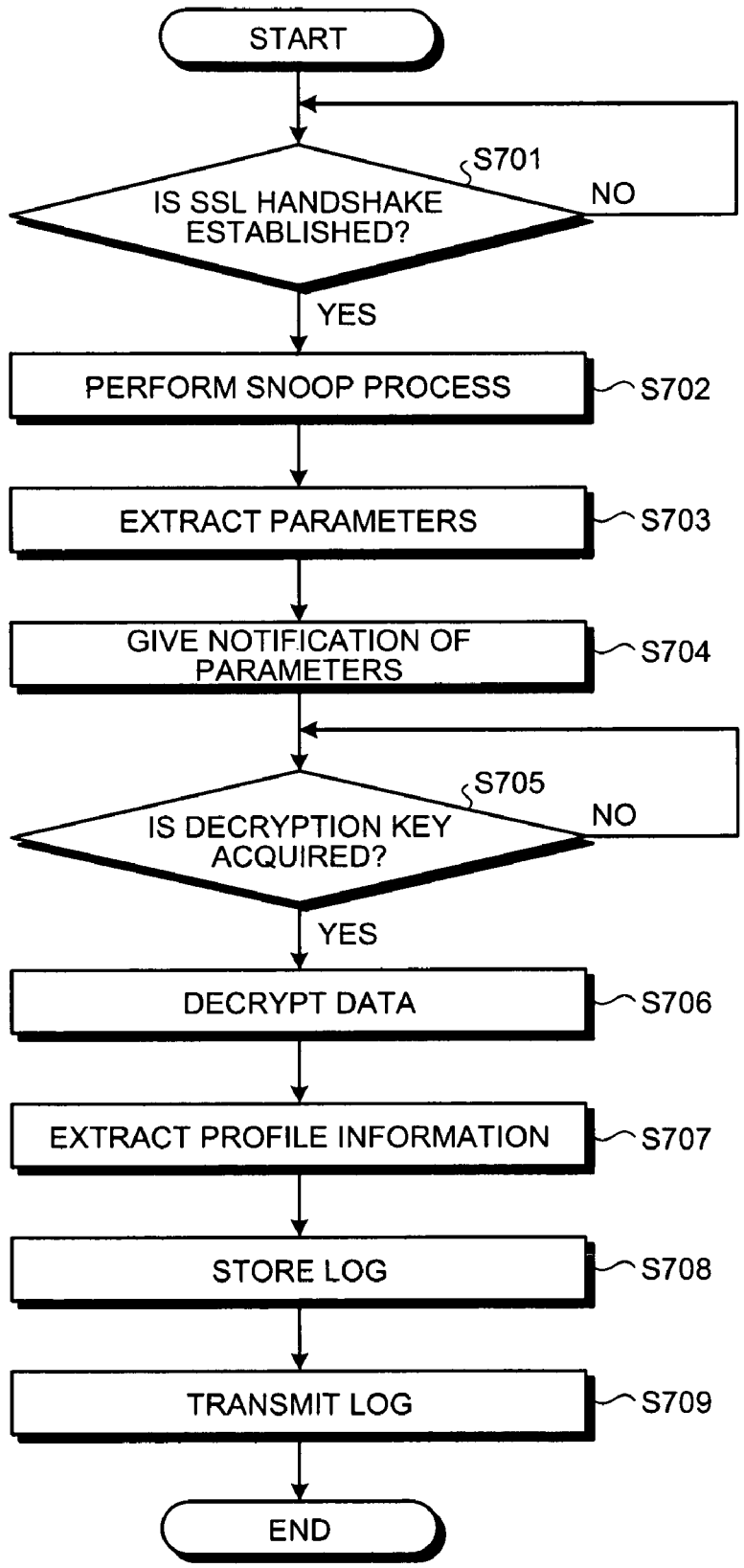
FIG. 7 is a flowchart of a communication log transmitting process performed by the communication device in the system according to the first embodiment.

Next, a flowchart of a communication log transmitting process performed by the communication device A 10 shown in FIG. 2 will be described with reference to FIG. 7. FIG. 7 is a flowchart of the communication log transmitting process performed by the communication device A 10 in the system according to the first embodiment.

When the encrypted packet data, such as the electronic file, is exchanged via the communication device A 10 and a new SSL handshake passing through the communication device A 10 is established (Yes at Step S701), the communication device A 10 collects the encrypted package data passing through the communication device A 10 (Step S702).

Specifically, before the encrypted packet data, such as the electronic file, is transmitted from the terminal X at the point A to the terminal Y at the point Y, the SSL handshake is established. Through the SSL handshake, control-related information, such as the method and protocol for performing communication between the terminal X and the terminal Y, is exchanged in advance. The snoop processing unit 15a of the communication device A 10 collects the encrypted packet data, such as the electronic file, passing through the communication device A 10 and stores the collected encrypted packet data in the snoop data storage unit 14a.

Next, the parameter extracting unit 15b of the communication device A 10 extracts the parameters required to generate the decryption key used when the packet data collected by the snoop processing unit 15a is decrypted (Step S703).

Specifically, the parameter extracting unit 15b of the communication device A 10 extracts the plain-text "Client Random" parameter, the "Server Random" parameter, and the encrypted "PreMaster Secret" parameter that are exchanged during the SSL handshake. The parameters are required to generate the decryption key used when the packet data collected by the snoop processing unit 15a is decrypted. The parameter extracting unit 15b then notifies the parameter notifying unit 15c of the extracted parameters.

Subsequently, the parameter notifying unit 15c of the communication device A 10 notifies the key managing device of the parameters extracted by the parameter extracting unit 15b (Step S704). Specifically, when the parameter notifying unit 15c of the communication device A 10 is notified of the extracted parameters by the parameter extracting unit 15b, the parameter notifying unit 15c notifies the key managing device of the plain-text "Client Random" parameter, the "Server Random" parameter, and the encrypted "PreMaster Secret" parameter. The key managing device generates the "decryption key #AA" using the parameters of which the notification has been given by the parameter notifying unit 15c and the secret key held in advance. The "decryption key #AA" is used to decrypt the collected packet data. The key managing device then transmits the generated "decryption key #AA" to the decryption key acquiring unit 15d.

The decryption key acquiring unit 15d of the communication device A 10 acquires the decryption key, generated by the key managing device using the parameters of which the notification has been given by the parameter notifying unit 15c, from the key managing device (Yes at Step S705). Specifically, the decryption key acquiring unit 15d of the communication device A 10 acquires the "decryption key #AA" from the key managing device. The key managing device generates the "decryption key #AA" using the parameters of which the notification has been given by the parameter notifying unit 15c and the secret key. The decryption key acquiring unit 15d then transmits the acquired "decryption key #AA" to the data decrypting unit 15e.

Next, the data decrypting unit 15e of the communication device A 10 decrypts the collected packet data using the decryption key acquired by the decryption key acquiring unit 15d (Step S706). Specifically, the data decrypting unit 15e of the communication device A 10 decrypts the encoded packet data stored in the snoop data storage unit 14a using the decryption key acquired by the decryption key acquiring unit 15d. The data decrypting unit 15e of the communication device A 10 then notifies the profile information extracting unit 15f that the encrypted packet data has been decrypted.

The profile information extracting unit 15f of the communication device A 10 analyzes the decrypted packet data and extracts the profile information of the analyzed packet data (Step S707). The profile information extracting unit 15f then stores the extracted profile information in the log storage unit 14b (Step S708).

Specifically, the profile information extracting unit 15f of the communication device A 10 analyzes the packet data decrypted by the data decrypting unit 15e, and then extracts the analyzed profile information, such as the "packet data name, level of importance, type, and user information". The profile information extracting unit 15f then stores the extracted profile information in the log storage unit 14b as the communication log.

The log transmitting unit 15g of the communication device A 10 transmits the profile information stored in the log storage unit 14b and the network information related to the network through which the encrypted packet data has passed to the communication log device as the communication log (Step S709).

Specifically, the log transmitting unit 15g of the communication device A 10 transmits the profile information, such as the "packet data name, level of importance, type, and user information", stored in the log storage unit 14b and the network information related to the network, such as "passage time, packet data transmitting source, and packet data transmitting destination", acquired when the encrypted packet data passes through the communication device A 10 to the communication log device as the communication log. The communication log device stores the profile information and the network information transmitted from the log transmitting unit 15g of the communication device A 10 in the predetermined storage section as the communication log.

Figure 8:
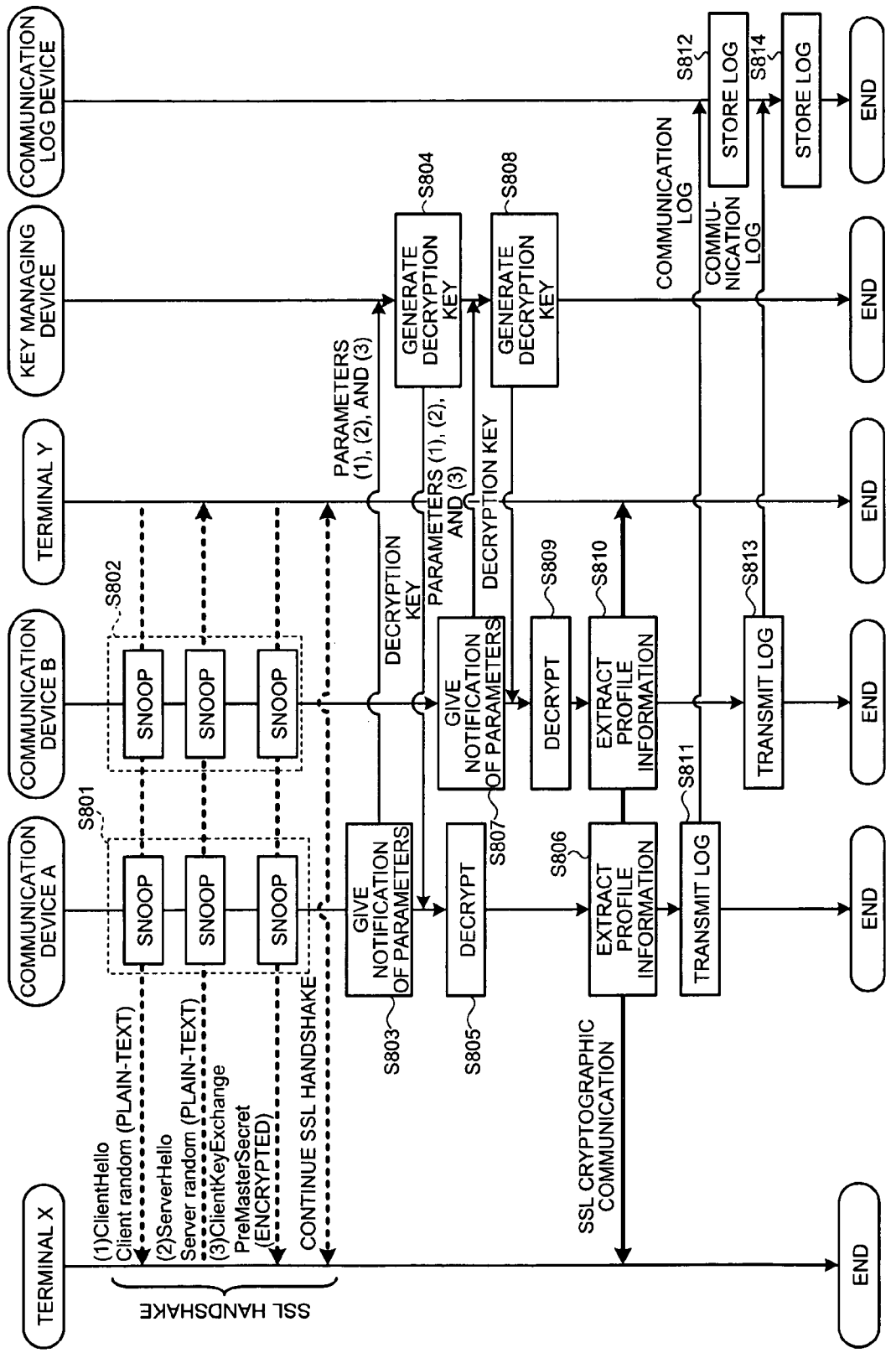
FIG. 8 is a diagram of a control sequence of the communication log transmitting process performed in the overall system including the communication device according to the first embodiment.

Next, a control sequence of a communication log transmitting process performed among the terminal X, the communication device A, the communication device B, the terminal Y, the key managing device, and the communication log device shown in FIG. 1 will be described with reference to FIG. 8. FIG. 8 is a diagram of the control sequence of the communication log transmitting process performed by the overall system including the communication device according to the first embodiment.

Before the encrypted packet data, such as the electronic file, is transmitted from the terminal X to the terminal Y, the SSL handshake is established as shown in FIG. 8. Through the SSL handshake, control-related information, such as the method and protocol for performing communication between the terminal X and the terminal Y, is exchanged in advance.

A following specific example is given. As a result of the SSL handshake, control information required for the terminal X to communicate with the terminal Y using the SSL and the plain-text "Client Random" parameter are sent from the terminal Y to the terminal X (see (1) in FIG. 8). The control information includes an SSL version number of the terminal Y, encryption settings, session-unique data, and the like. Similarly, control information required for the terminal Y to communicate with the terminal X using the SSL and the plain-text "Server Random" parameter are sent from the terminal X to the terminal Y (see (2) in FIG. 8). The control information includes an SSL version number of the terminal X, encryption settings, session-unique data, and the like. The terminal Y generates the "PreMaster Secret" of the session using all pieces of data generated through the SSL handshake and encrypts the "PreMaster Secret" using a public key of the terminal X acquired from the information transmitted from the terminal X. The terminal Y then transmits the encrypted "PreMaster Secret" to the terminal X (see (3) in FIG. 8).

Next, after the establishment of the SSL handshake is recognized and the encrypted packet data, such as the electronic file, is transmitted from the terminal X to the terminal Y, the communication device A and the communication device B collect the encrypted packet data passing through the communication device A. The communication device A and B extract the parameters required to generate the decryption key used when the collected encrypted packet data is decrypted (Step S801 and S802).

Specifically, after the establishment of the SSL handshake between the terminal X and the terminal Y is recognized, the communication device A and the communication device B collect the encrypted packet data passing through the communication device A and the communication device B. The communication device A and the communication device B store the collected packet data in the predetermined storage section. The communication device A and the communication device B then extract the "Client Random" parameter, the "Server Random" parameter, and the "PreMaster Secret" parameter required to generate the decryption key used when the collected encrypted packet data is decrypted.

Subsequently, the communication device A notifies the key managing device of the extracted parameters (Step S803). Specifically, the communication device A notifies the key managing device of the extracted "Client Random" parameter, the "Server Random" parameter, and the "PreMaster Secret" parameter.

The key managing device generates the decryption key using the parameters of which the notification has been given and the secret key held in advance and transmits the generated decryption key to the communication device A (Step S804). Specifically, the key managing device decrypts the "PreMaster Secret" parameter of which the notification has been given by the communication device A using a server secret key of the terminal X held in advance. The key managing device then generates the decryption key from the information that is the decrypted "PreMaster Secret" parameter, the "Client Random" parameter, and the "Server Random" parameter, in adherence to a calculation formula (refer to Section 6.3 of RFC 2246). The key managing device transmits the generated decryption key to the communication device A.

Next, the communication device A decrypts the collected packet data using the acquired decryption key (Step S805), and then extracts the profile information of the decrypted and analyzed packet data (Step S806).

Specifically, the communication device A decrypts the collected encrypted packet data using the acquired decryption key and analyzes the decrypted packet data. The communication device A extracts the profile information, such as the "packet data name, level of importance, type, and user information", and stores the extracted profile information in the predetermined storage section as the communication log.

The same process as that performed by the communication device A and the key managing device, described above, is performed by the communication device B and the key managing device (Step S807 to Step S810).

The communication device A transmits the extracted profile information and the network information related to the network through which the encrypted packet data passes to the communication log device as the communication log (Step S811).

Specifically, the communication device A transmits the extracted profile information, such as the "packet data name, level of importance, type, and user information", and the network information related to the network, such as the "passage time, packet data transmitting source, and packet data transmitting destination", acquired when the packet data passes through the communication device A to the communication log device as the communication log.

The communication log device stores the profile information and the network information transmitted from the communication device A in the predetermined storage section as the communication log (Step S812). Specifically, the communication log device sequentially stores the profile information, such as the "packet data name, level of importance, type, and user information", and the network information related to the network, such as the "passage time, packet data transmitting source, and packet data transmitting destination", acquired when the packet data passes through the communication device A in the predetermined storage section as the communication log, in order of the passage time at which the packet data passes through the communication device A.

The same process as that performed by the communication device A and the communication log device, described above, is performed by the communication device B and the communication log device (Step S813 to Step S814).

In this way, according to the first embodiment, the encrypted packet data passing through the communication device is collected. The parameters required to generate the decryption key used when the collected packet data is decrypted are extracted. The key managing device is notified of the extracted parameters. The decryption key, generated by the key managing device using the parameters of which the notification has been given, is acquired from the key managing device. The collected packet data is decrypted using the acquired decryption key. The decrypted packet data is analyzed. The profile information of the analyzed packet data is extracted. The extracted profile information and the network information related to the network through which the encrypted packet data passes are transmitted to the communication log device as the communication log. As a result, the logs of cryptographic communication, network information, and the like can be safely and accurately collected.

For example, when the communication device A and the communication device B are connected by the network and the encrypted packet data is transmitted from a terminal connected to the communication device A, the communication device A extracts the parameters from the encrypted packet data and notifies the key managing device of the extracted parameters. Then, the key managing device generates the decryption key using the parameters of which the notification has been given by the communication device A and transmits the generated decryption key to the communication device A. The communication device A decrypts the encrypted packet data using the decryption key transmitted from the key managing device and analyzes the decrypted packet data. The communication device A extracts the profile information and transmits the extracted profile information and the network information related to the network to the communication log device as the communication log.

In the first embodiment, the profile information, such as the "packet data name, level of importance, type, and user information", is transmitted when the communication log of the cryptographic communication over the network is transmitted to the communication log device. However, the present invention is not limited thereto. A "packet data identifier" and a "sequence number" can also be transmitted in addition to the "packet data name, level of importance, type, and user information".

Figure 9:
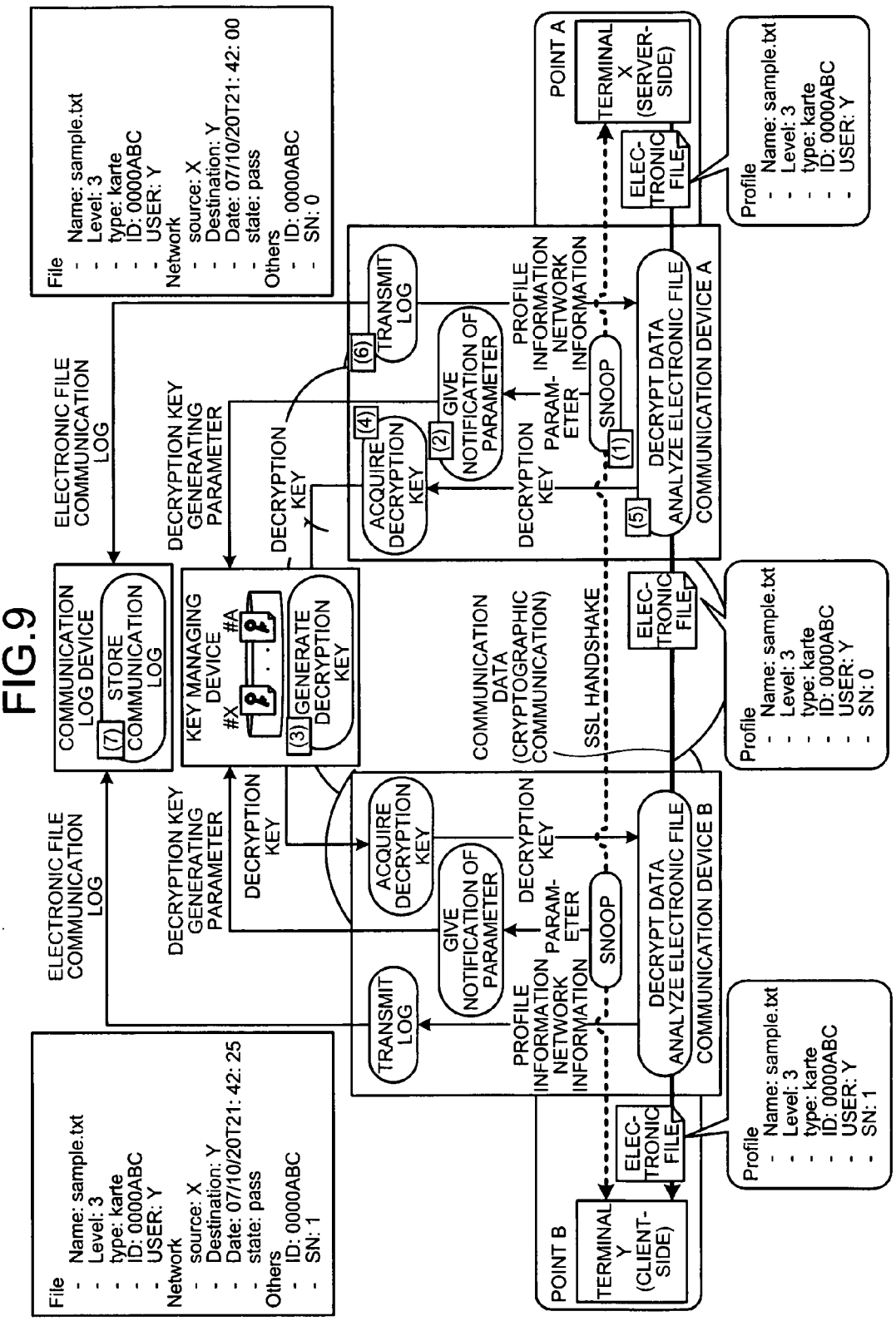
FIG. 9 is a diagram of an overall configuration of a system including a communication device according to a second embodiment of the present invention.

According to a second embodiment, when profile information including an "identifier uniformly identifying the packet data" and a "sequence number" that is a passage order by which the packet data passes through the communication device are transmitted to the communication log device as the communication log is described. FIG. 9 is a diagram of an overall configuration of a system including a communication device according to the second embodiment.

The system including the communication device includes the communication device A, the communication device B, the key managing device, and the communication log device, as does the system according to the first embodiment. The communication device A is connected to the terminal X at the point A. The communication device B is connected to the terminal Y at the point B. The terminal X and the terminal Y are connected such that cryptographic communication can be performed therebetween.

The second embodiment differs from the first embodiment in that the "identifier uniformly identifying the packet data" is attached in advance to the packet data, such as the electronic file, transmitted from the terminal X at the point A to the terminal Y at the point B. In addition, when the packet data is transmitted from the terminal X at the point A to the terminal Y at the point B, the communication device A and the communication device B, through which the packet data passes, attaches the "sequence number" that is a passage order by which the packet data passes through the communication device.

A flow of a process performed to receive the packet data to which the identifier is attached and to attach the sequence number will be described in detail. As described in the first embodiment, in the system of the second embodiment, the communication device A collects the encrypted packet data passing through the communication device A and then extracts the parameters required to generate the decryption key used when the collected packet data is decrypted. The communication device A notifies the key managing device of the extracted parameters and acquires the decryption key from the key managing device. The decryption key is generated by the key managing device using the parameters of which the notification has been given (see (1) to (4) in FIG. 9).

Subsequently, the communication device A decrypts the collected packet data using the acquired decryption key and analyzes the decrypted packet data. The communication device A extracts the analyzed profile information including the "identifier uniformly identifying the packet data" and adds the "sequence number" (see (5) in FIG. 9). Specifically, the communication device A decrypts the collected packet data using the decryption key received from the key managing device and analyzes the decrypted packet data. The communication device A extracts the profile information including the "packet data name, level of importance, type, user information, and identifier uniformly identifying the packet data" (for example, identifier ID:"0000ABC") and the like. The communication device A also attaches the "sequence number" (for example, sequence number SN: "0"). According to the second embodiment, when the communication device A receives the packet data to which the terminal X has attached the "identifier" is described. However, when the "identifier" is not attached to the packet data when the communication device A receives the packet data, the communication device A attaches the "identifier" and the "sequence number".

The communication device A then transmits the extracted profile information including the "identifier", the network information related to the network through which the encrypted packet data passes, and the attached "sequence number" to the communication log device as the communication log. The communication log device stores the transmitted communication log in the predetermined storage section (see (6) and (7) in FIG. 9).

Specifically, the communication device A transmits the extracted profile information including the identifier, the network information such as the "passage time" at which the encrypted packet data passes through the communication device A, and the attached "sequence number" to the communication log device as the communication log. The communication log device stores the profile information, the network information, and the sequence number in the predetermined storage section as the communication log. At the same time, the same process as that performed by the communication device A is performed by the communication device B. The communication device B increments the "sequence number" attached by the communication device A and transmits the collected profile information, the network information, and the incremented "sequence number" to the communication log device as the communication log.

Figure 10:
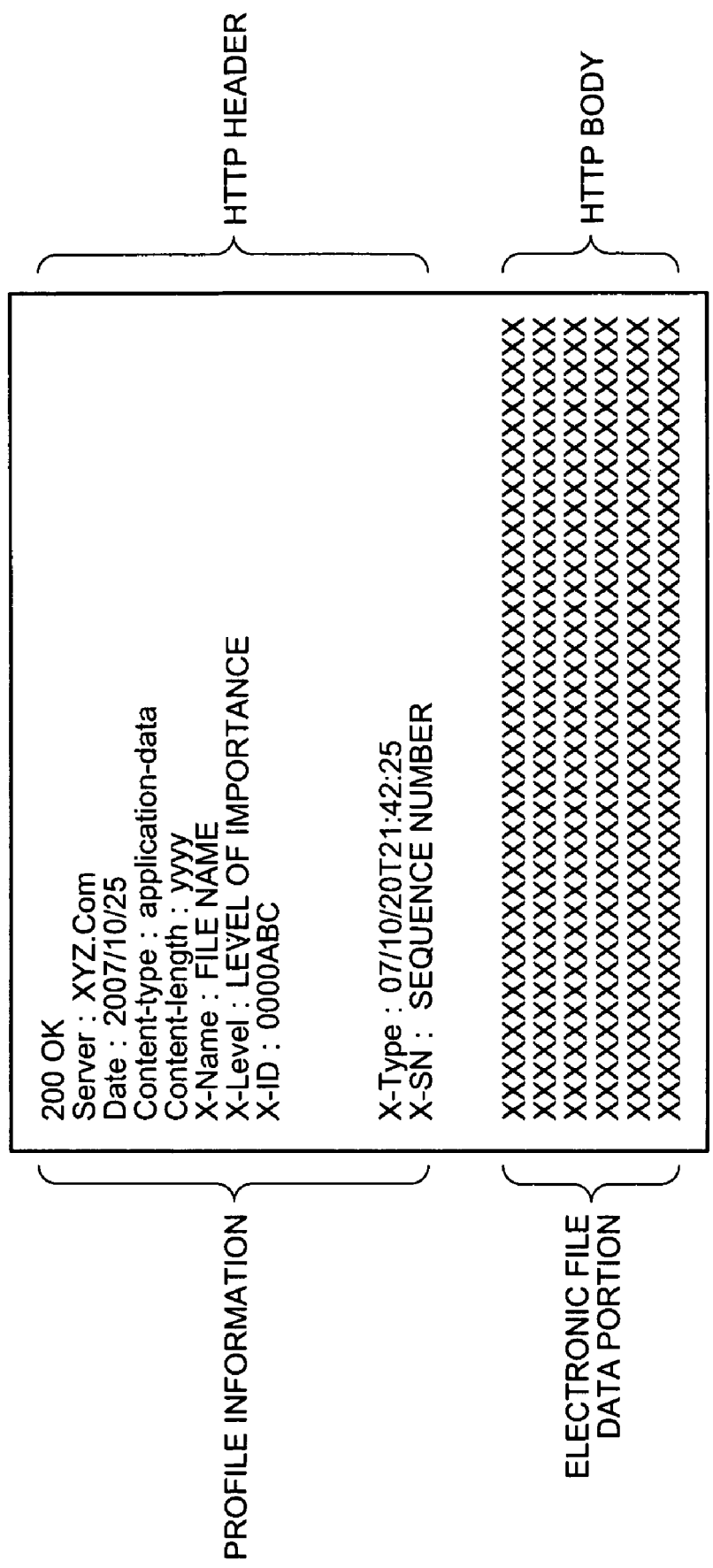
FIG. 10 is a diagram of an example of a data format of contents transmitted from a server to a client terminal when HTTP is used, according to the second embodiment.
Figure 11:
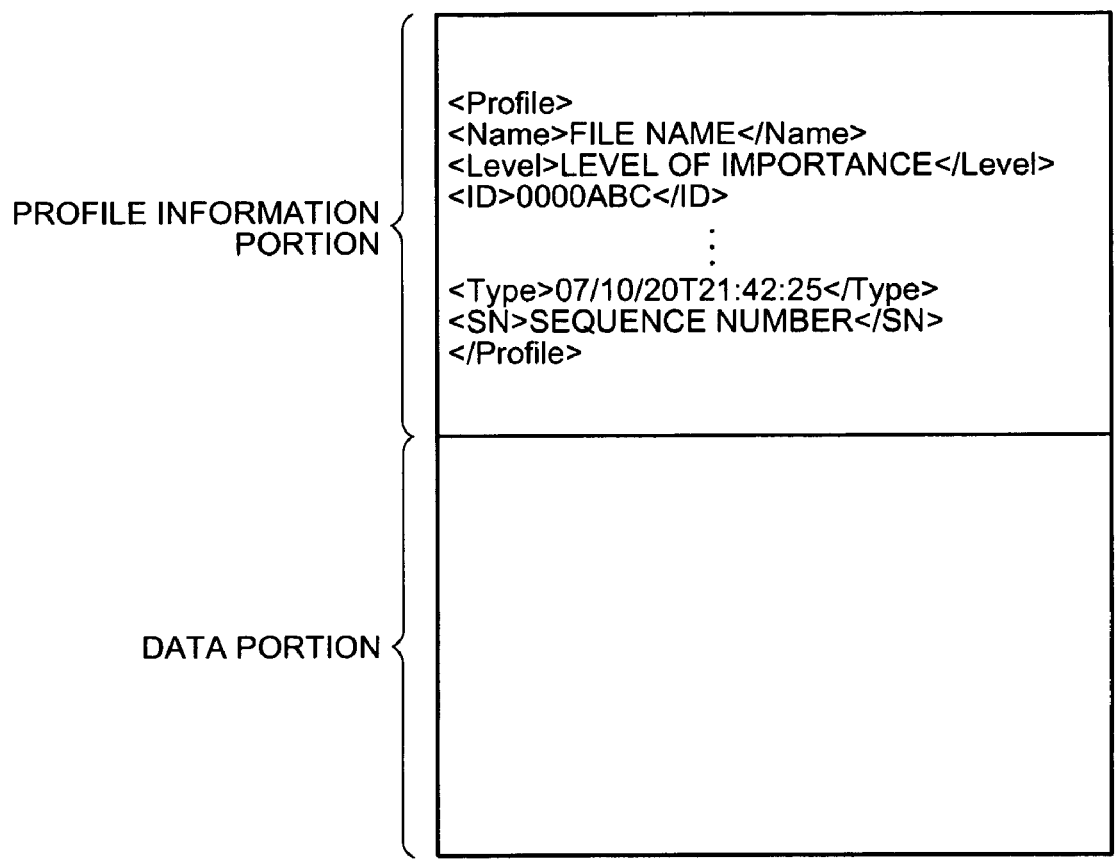
FIG. 11 is a diagram of an example of a data format of contents transmitted from the server to the client terminal when HTTP/FTP is used, according to the second embodiment.

For example, when the communication device A transmits the electronic file to the communication device B using HTTP, the communication device A transmits the electronic file using a data format such as that shown in FIG. 10. As shown in FIG. 10, the profile information is stored in the HTTP header area of the HTTP. For example, when the communication device A transmits the electronic file to the communication device B using HTTP/FTP, the communication device A transmits the electronic file using a data format such as that shown in FIG. 11. As shown in FIG. 11, the profile information is integrated with the electronic file data. For example, when the communication device A transmits the communication log to the communication log device, the communication device A transmits the communication log using a data format such as that shown in FIG. 12. As shown in FIG. 12, the data format of the communication log includes the identifier "ID:0000ABC", the sequence number "SN:0", and the like. In this way, the communication device A can transmit required data even when communication protocols differ, such as HTTP and FTP. FIG. 10 is a diagram of an example of a data format of contents transmitted from a server to a client terminal when HTTP is used, according to the second embodiment. FIG. 11 is a diagram of an example of a data format of contents transmitted from a server to a client terminal when HTTP/FTP is used, according to the second embodiment. FIG. 12 is a diagram of an example of a data format of the communication log transmitted from the communication device to the communication log device, according to the second embodiment.

When the profile information, the network information, and the "sequence number" such as that shown in FIG. 13 is received, the communication log device groups the received profile information, network information, and "sequence number" by each "identifier uniformly identifying the packet data" included in the profile information and sequentially stores the pieces of information in the predetermined storage area, such as the log management table, in order of the "sequence number". FIG. 13 is a diagram of an example of the log management table of the communication log device in the system including the communication device according to the second embodiment.

According to the second embodiment, the communication device attaches the sequence number when the packet data passes through the communication device. The sequence number is the passage order by which the packet data passes through the communication device. The communication device extracts the profile information including the identifier that uniformly identifies the packet data. The communication device then transmits the extracted profile information including the identifier, the network information related to the network through which the encrypted packet data passes, and the sequence number that is the passage order by which the packet data to which the sequence number is attached passes through the communication device to the communication log device. As a result, although the communication log device manages the communication logs based on "time information", when a plurality of communication logs have a same identifier, the communication log device can associate the communication logs and manage the communication logs as a single group of communication logs using the "identifier uniformly identifying the packet data". Even when time at each communication device is inaccurate, a time sequence of the communication logs can be determined through use of the "sequence number". A function for attaching the "identifier uniformly identifying the packet data" and the like can be eliminated from the transmitting source terminal that transmits the packet data.

The communication device decrypts the packet data using the decryption key generated from the parameters extracted from the encrypted packet data and analyzes the decrypted packet data. The communication device transmits the "profile information" including the identifier uniformly identifying the packet data, the "network information", and the "sequence number" to the communication log device.

As described in the first embodiment and the second embodiment, the packet data entered into each communication device is transmitted to all transmitting destination terminals when the packet data is transmitted between each terminal. However, the present invention is not limited thereto. When the encrypted packet data is entered into the communication device via the network, a transfer judgment regarding the entered packet data can be performed based on a transfer rule.

According to a third embodiment, the transfer judgment is performed based on the transfer rule of the packet data. FIG. 14 is a diagram of an overall configuration of a system including a communication device of the third embodiment.

In the third embodiment, the system including the communication device includes the communication device A, the communication device B, the key managing device, and the communication log device, as do the systems of the first embodiment and the second embodiment. The communication device A is connected to the terminal X at the point A. The communication device B is connected to the terminal Y at the point B. The terminal X and the terminal Y are connected such that cryptographic communication can be performed therebetween.

The system of the third embodiment differs from those of the first embodiment and the second embodiment in that the communication device A has transfer rules, such as permitting packet data transfer when packet data type is "karte" and the level of importance is "2" or less. The communication device temporarily performs a communication terminating process to judge the transfer of the entered packet data.

As described in the first embodiment, the communication device A collects the encrypted packet data passing through the communication device A, and extracts the parameters required to generate the decryption key used when the collected packet data is decrypted. The communication device A notifies the key managing device of the extracted parameters, and then acquires the decryption key generated by the key managing device from the key managing device (see (1) to (4) in FIG. 14).

Subsequently, the communication device A decrypts the collected packet data using the acquired decryption key and analyzes the decrypted packet data. The communication device A extracts the profile information of the analyzed packet data. When the communication device A judges that the packet data cannot be transferred based on the extracted parameters and a passage rule held by the communication device A, the communication device discards the packet data. When the communication device A judges that the packet data can be transferred, the communication device A transfers the packet data (see (5) in FIG. 14).

Specifically, the communication device A decrypts the collected packet data using the "decryption key #AA" received from the key managing device and analyzes the decrypted packet data. The communication device A extracts the profile information including the "packet data name, level of importance, type, and user information", and the like. When the communication device A judges that the packet data cannot be transferred based on the "level of importance and type" in the extracted profile information and the held passage rule, the communication device A discards the packet data. When the communication device A judges that the packet data can be transferred, the communication device A transfers the packet data.

For example, when the communication device A collects packet data of which the type is "karte" and the level of importance is "4", the communication device A judges that the packet data cannot be transferred and discards the packet data. When the communication device A collects packet data of which the type is "karte" and the level of importance is "2", the communication device A judges that the packet data can be transferred and transfers the packet data.

When the communication device A judges that the packet data cannot be transferred, the communication device A transmits the extracted profile information and network information including information indicating that the packet data has been discarded to the communication log device as the communication log. When the communication device A judges that the packet data can be transferred, the communication device A transmits the extracted profile information and network information including information indicating that the packet data has been transferred to the communication log device as the communication log. The communication log device stores the transmitted communication log to the predetermined storage section (see (6) and (7) in FIG. 14).

This is described in detail as follows, using the above-described example. When the communication device A judges that the packet data cannot be transferred, the communication device A discards the packet data, and transmits the profile information and the network information including information "state:scrap" indicating that the packet data has been discarded to the communication log device. When the communication device A judges that the packet data can be transferred, the communication device A transfers the packet data, and transmits the profile information and the network information including information "state:pass" indicating that the packet data has been transferred to the communication log device. The communication log device stores the profile information and the network information transmitted from the communication device A in the predetermined storage section as the communication log. The same process as that performed by the communication device A is performed by the communication device B when the packet data is transmitted from the terminal Y at the point B to the terminal X at the point A.

Figure 15:
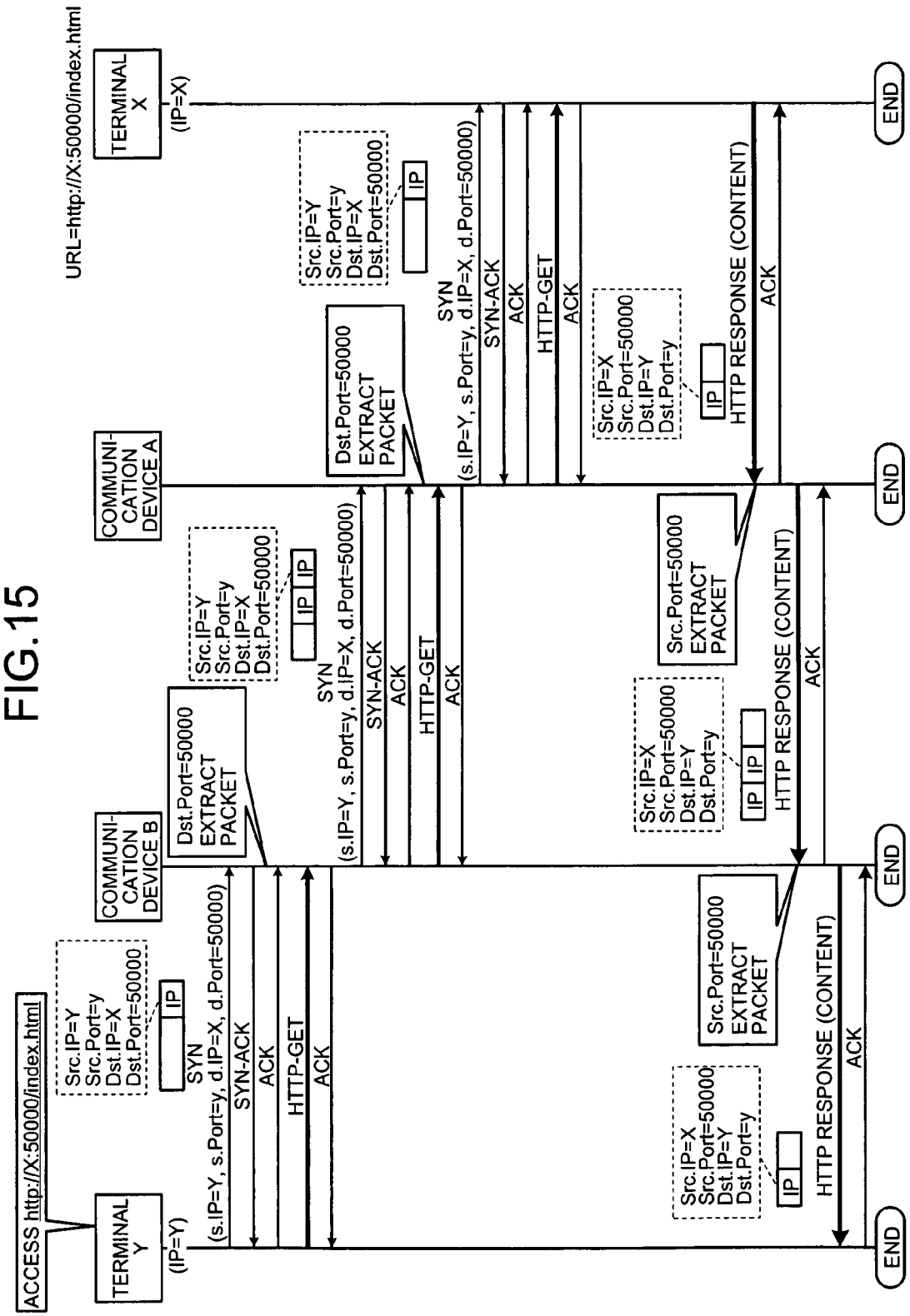
FIG. 15 is a diagram of a control sequence of a terminating process in a transfer judging process performed in the system including the communication device according to the third embodiment.

According to the third embodiment, the communication device A receives the packet data once to judge whether the packet data can be transferred. Therefore, a packet transfer terminating process is performed between the terminals. The terminating process in a transfer judging process will be described with reference to FIG. 15. FIG. 15 is a diagram of a control sequence of the terminating process in the transfer judging process performed in the system including the communication device according to the third embodiment.

When the communication device A and the communication device B discover a communication through certain port numbers, the communication device A or the communication device B performs the terminating process for a TCP (Transmission Control Protocol) communication in place of the terminal X. For example, when the terminal X at the point A transmits the packet data, such as the electronic file, to the terminal Y, the communication device A terminates the TCP communication, and then transmits "TCP-ACK" that is a response to the termination to the terminal X. After the communication device A completes the analysis, decryption, and log storage of the packet data and the like, the communication device A transmits the data and an IP (Internet Protocol)/Port number of the terminal X that is the transmitting source at the time the communication device A received the packet data. As a result, all communication devices are transmittable from the terminal Y that is the transmitting destination, preventing effects of communication termination between the terminal X and the terminal Y. When a communication protocol between the terminals is terminated by the communication device without a communication response process being performed in each communication terminal, communication is terminated in the transmitting destination terminal.

When the communication device terminates the protocol and the packet data is reconstructed, buffer memory provided in the communication device may become insufficient depending on data volume of the packet data. To solve this problem, the communication device starts packet data transfer upon making the transfer judgment, even when the entire packet data is not yet received. As a result, insufficient buffer memory and buffer memory overflow occurring when large-volume packet data is transmitted can be prevented. When the overflow is likely to occur in the buffer memory of the communication device, the communication device reduces a TCP window size for the terminal and the like. As a result, the communication device can control the volume of packet data transmitted from the transmitting source terminal and prevent the buffer memory overflow in the communication device in advance.

Figure 16A:
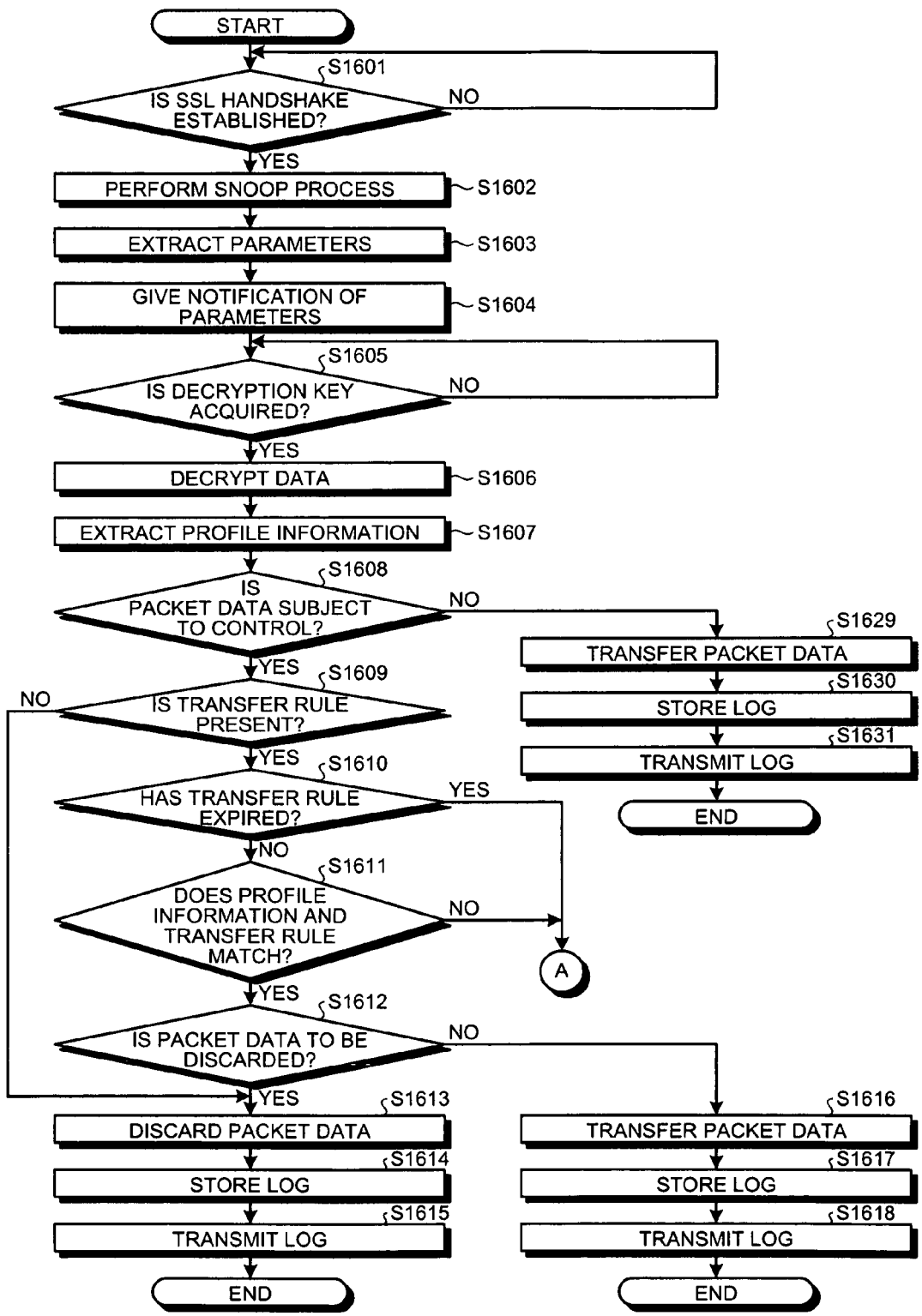
FIGS. 16A and 16B are flowcharts of the transfer judgment process performed by the communication device in the system according to the third embodiment.
Figure 16B:
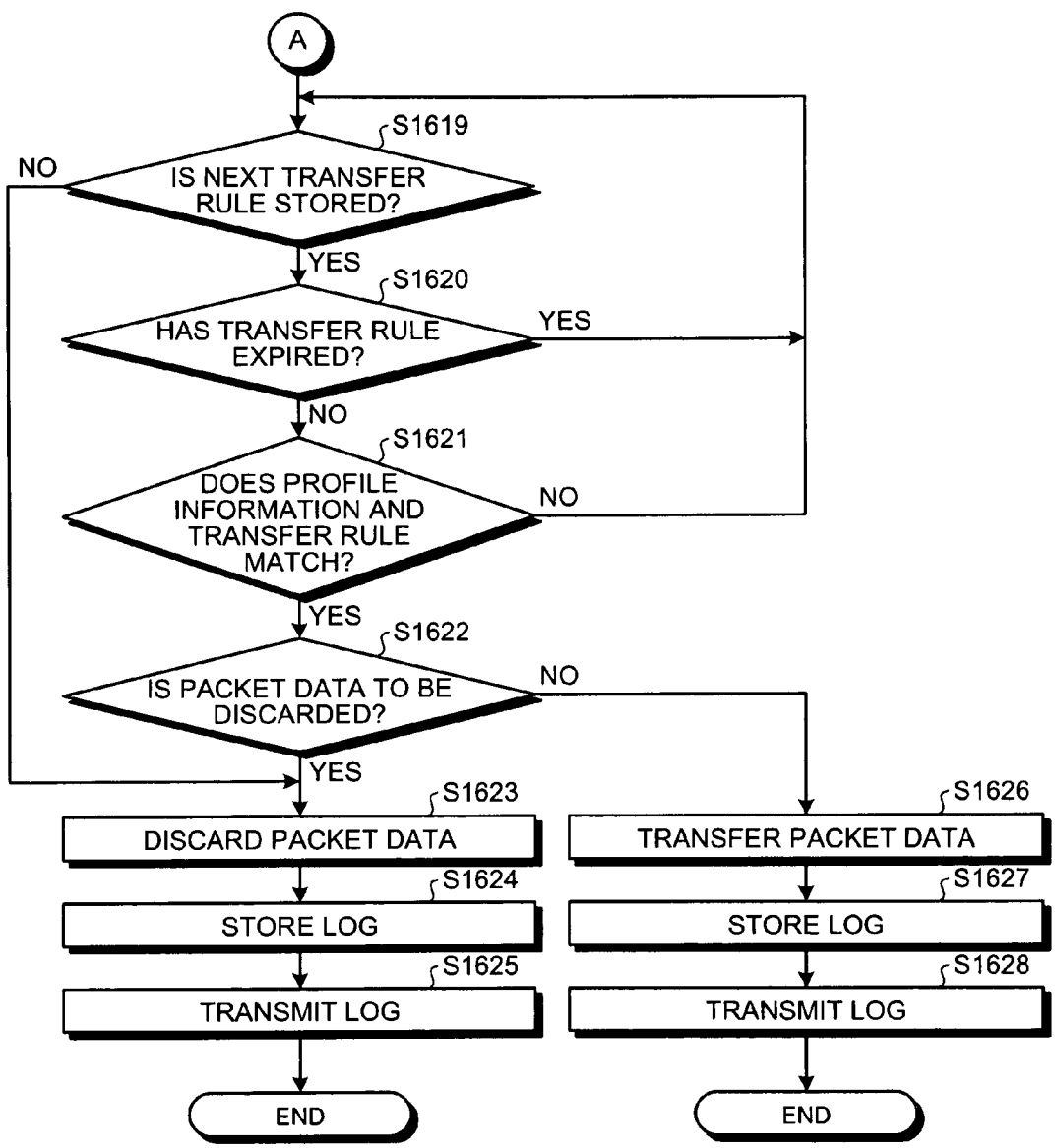

A flowchart of the transfer judgment process performed by the communication device shown in FIG. 14 will be described with reference to FIGS. 16A and 16B. FIGS. 16A and 16B are flowcharts of the transfer judgment process performed by the communication device in the system according to the third embodiment. Procedures performed at Step S1601 to Step S1607 in FIGS. 16A and 16B are the same as those at Step S701 to Step S707 in FIG. 7. Detailed descriptions thereof will not be repeated here.

When the encrypted packet data, such as the electronic file, is exchanged via the communication device and a new SSL handshake passing through the communication device is established (Yes at Step S1601), the communication device collects the encrypted package data passing through the communication device (Step S1602) as shown in FIGS. 16A and 16B.

Next, the communication device extracts the parameters required to generate the decryption key used when the collected packet data is decrypted (Step S1603). The communication device then notifies the key managing device of the extracted parameters (Step S1604).

The communication device acquires the decryption key, generated by the key managing device using the parameters of which the notification has been given, from the key managing device (Yes at Step S1605). The communication device then decrypts the collected packet data using the acquired decryption key (Step S1606). The communication device analyzes the decrypted packet data and extracts the profile information of the analyzed packet data (Step S1607).

Subsequently, the communication device judges whether the packet data is subject to transfer control depending on whether the extracted profile information is present (Step S1608). When the packet data is subject to the transfer control (Yes at Step S1608), the communication device judges whether the transfer rule is present (Step S1609).

Specifically, when the extracted profile information is present, the communication device judges whether the transfer rule is present. When the packet data is judged at Step S1608 to not be subject to the transfer control (No at Step S1608), the communication device transfers the packet data to the transmitting destination terminal (Step S1629). Procedures performed at Step S1630 and Step S1631 in FIGS. 16A and 16B are the same as those performed at Step S708 and Step S709 in FIG. 7. Descriptions thereof will not be repeated here.

When the transfer rule is present (Yes at Step S1609), the communication device judges whether the transfer rule has expired (Step S1610). When the communication device judges that the transfer rule has not expired (No at Step S1610), the communication device judges whether the profile information matches the transfer rule (Step S1611).

Specifically, when the transfer rule stored in the predetermined storage section is present, the communication device judges whether the transfer rule has expired. When the transfer rule is judged to have not expired, the communication device judges whether "level of importance", "type", and the like included in the extracted profile information match the transfer rule.

When the extracted profile information matches the transfer rule (Yes at Step S1611), the communication device judges whether the packet data is to be discarded (Step S1612). When the communication device judges that the packet data is to be discarded (Yes at Step S1612), the communication device discards the packet data (Step S1613). When the communication device judges at Step S1612 that the packet data is not to be discarded (No at Step S1612), the communication device transfers the packet data (Step S1616).

Specifically, when the "level of importance", "type", and the like included in the extracted profile information match conditions of the transfer rule, the communication device judges whether the packet data is to be discarded. When the communication device judges that the packet data is to be discarded, the communication device discards the packet data. When the communication device judges that the packet data is not to be discarded, the communication device transfers the packet data to the transmitting destination terminal. Procedures performed at Step S1614 and Step S1615, and Step S1617 and Step S1618 in FIGS. 16A and 16B are the same as those performed at Step S708 to Step S709 in FIG. 7. Descriptions thereof will not be repeated here.

At the same time, when the transfer rule has expired (Yes at Step S1610) or when the profile information and the transfer rule do not match (No at Step S1611), the communication device judges whether a next transfer rule is stored in the predetermined storage section (Step S1619).

Specifically, when the transfer rule is expired at Step S1610 or when the "level of importance", "type", and the like included in the extracted profile information do not match the conditions of the transfer rule at Step S1611, the communication device judges whether another transfer rule is stored in the predetermined storage section.

When the communication device judges that the next transfer rule is stored (Yes at Step S1619), the communication device judges whether the transfer rule has expired (Step S1620) When the communication device judges that the transfer rule has not expired (No at Step S1620), the communication device judges whether the profile information matches the transfer rule (Step S1621).

Specifically, when the communication device judges that another transfer rule is stored in the predetermined storage section, the communication device judges whether the transfer rule has expired. When the communication device judges that the transfer rule has not expired, the communication device judges whether the "level of importance", "type", and the like included in the extracted profile information match the conditions of the transfer rule.

When the communication device judges that the profile information matches the transfer rule (Yes at Step S1621), the communication device judges whether the packet data is to be discarded (Step S1622). When the communication device judges that the packet data is to be discarded (Yes at Step S1622), the communication device discards the packet data (Step S1623). When the communication device judges that the packet data is not to be discarded (No at Step S1622), the communication device transfers the packet data (Step S1626).

Specifically, when the communication device judges that the "level of importance", "type", and the like included in the extracted profile information match the conditions of the transfer rule, the communication device judges whether the packet data is to be discarded. When the communication device judges that the packet data is to be discarded, the communication device discards the packet data. When the communication device judges that the packet data is not to be discarded, the communication device transfers the packet data to the transmitting destination terminal. Procedures performed at Step S1624 and Step S1265, and Step S1627 and Step S1628 in FIGS. 16A and 16B are the same as those performed at Step S708 to Step S709 in FIG. 7. Descriptions thereof will not be repeated here. When the communication device judges at Step S1620 that the transfer rule has expired (Yes at Step S1620) or when the communication device judges at Step S1621 that the "level of importance", "type", and the like included in the extracted profile information do not match the conditions of the transfer rule (No at Step S1621), the communication device repeats the process from Step S1619. When the communication device judges at Step S1619 that a next transfer rule is not stored (No at Step S1619), the communication device discards the packet data (Step S1623).

In this way, according to the third embodiment, the communication device holds the transfer rule indicating whether the packet data can be transferred to the transmitting destination device. When the communication device judges that the packet data cannot be transferred based on the held transfer rule, the communication device discards the packet data. When the communication device judges that the packet data can be transferred, the communication device transfers the packet data. When the communication device judges that the packet data cannot be transferred, the communication device transmits the network information including the information indicating that the packet data has been discarded and the profile information to the communication log device as the communication log. When the communication device judges that the packet data can be transferred, the communication device transmits the network information including the information indicating that the packet data has been transferred and the profile information to the communication log device as the communication log. As a result, the communication device can perform transfer control of the packet data.

For example, when the packet data is transferred from the point A including the communication device A to the point B including the communication device B, the communication device A holds a transfer rule permitting the packet data transfer of packet data of which the type is "karte" and the level of importance is "2" or less. When the communication device A collects packet data of which the level of importance is "4" and the type is "karte", based on the transfer rule, the communication device A judges that the packet data cannot be transferred and discards the packet data. The communication device A transmits the profile information and the network information including the information indicating that the packet data has been discarded to the communication log device. When the communication device A collects packet data of which the level of importance is "2" and the type is "karte", the communication device A judges that the packet data can be transferred and transfers the packet data. The communication device A transmits the profile information and the network information including the information indicating that the packet data has been transferred to the communication log device.

In the first embodiment to the third embodiment, the communication device notifies the key managing device of the parameters and acquires the decryption key generated by the key managing device. However, the present invention is not limited thereto. The communication device can generate the decryption key within the communication device itself without notifying the key managing device of the parameters.

According to a fourth embodiment, the communication device generates the decryption key used to decrypt cryptographic communication performed over the network. FIG. 17 is a diagram of an overall configuration of a system including a communication device according to the fourth embodiment.

As shown in FIG. 17, the system including the communication device includes the communication device A, the communication device B, and the communication log device. The communication device A is connected to the terminal X at the point A. The communication device B is connected to the terminal Y at the point B. The terminal X and the terminal Y are connected such that cryptographic communication can be performed therebetween.

The system of the fourth embodiment differs from those of the first embodiment to the third embodiment in that the communication device A holds the secret key of the terminal connected to the communication device. In the fourth embodiment, the communication device B acquires the decryption key.

The communication device generates the decryption key used when the encrypted packet data is decrypted, instead of the key managing device. When the encrypted packet data, such as the electronic file, is transmitted from the terminal X at the point A to the terminal Y at the point B, as described in the first embodiment, the communication device B collects the encrypted packet data passing through the communication device B. The communication device B extracts the parameters required to generate the decryption key used when the collected packet data is decrypted (see (1) in FIG. 17).

Next, the communication device B notifies the communication device A of the extracted parameters (see (2) in FIG. 17). The notification is described in detail as follows, using the above-described example. The communication device B notifies the communication device A of the extracted plaintext "Client Random" parameter, the "Server Random" parameter, and the "PreMaster Secret" parameter encrypted by the public key of the terminal X. The communication device A holds the "secret key #A" of the terminal X at the point A.

The communication device A that receives the notification of the parameters from the communication device B generates the decryption key using the parameters of which the notification has been received and the "secret key #A" (see (3) in FIG. 17). Specifically, in the above-described example, the communication device A decrypts the "PreMaster Secret" parameter of which the notification has been received using the "secret key #A" of the terminal X held by the communication device A. The communication device A generates the decryption key from the information that is the decrypted "PreMaster Secret" parameter, the "Client Random" parameter, and the "Server Random" parameter, in adherence to a calculation formula (refer to Section 6.3 of RFC 2246).

Next, the communication device B acquires the decryption key, generated by the communication device A using the parameters of which the notification has been received, from the communication device A (see (4) in FIG. 17). Specifically, the communication device B receives the "decryption key #AA" generated by the communication device A using cryptographic communication, such as SSL or IPSec. The "decryption key #AA" is valid only during a session between the communication device B and the communication device A. The "decryption key #AA" becomes invalid when the session ends.

Next, the communication device B decrypts the collected packet data using the acquired decryption key, analyzes the decrypted packet data, and then extracts the profile information of the analyzed packet data (see (5) in FIG. 17). Specifically, the communication device B decrypts the collected packet data using the "decryption key #AA" received from the communication device A, analyzes the decrypted packet data, and then extracts the profile information, such as the "packet data name, level of importance, type, and user information".

The communication device B then transmits the extracted profile information and network information related to the network through which the encrypted packet data passes to the communication log device as a communication log. The communication log device stores the transmitted communication log in the predetermined storage section (see (6) and (7) in FIG. 17).

Specifically, the communication device B transmits the extracted profile information, such as the "packet data name, level of importance, type, and user information", and the network information, such as the "packet data transmitting source, packet data transmitting destination, and passage time at which the packet data passes through the communication device B" to the communication log device as the communication log. The above network information is collected by the communication device B when the encrypted packet data passes through the communication device B. The communication log device then stores the profile information and the network information transmitted from the communication device B in the predetermined storage section as the communication log. In the communication device A, the communication device A generates the decryption key itself and performs the same processes as those performed by the communication device B. The communication device A transmits the collected profile information and network information to the communication log device as the communication log.

Next, a control sequence of a communication log transmitting process performed among the terminal X, the communication device B, the communication device A, the terminal Y, and the communication log device shown in FIG. 17 will be described with reference to FIG. 18. FIG. 18 is a diagram of the control sequence of the communication log transmitting process performed by the overall system including the communication device according to the fourth embodiment.

Before the encrypted packet data, such as the electronic file, is transmitted from the terminal X to the terminal Y, the SSL handshake is established so as to exchange control-related information, such as the method and protocol for performing communication between the terminal X and the terminal Y in advance.

A following specific example is given. As a result of the establishment of the SSL handshake, control information required for the terminal X to communicate with the terminal Y using the SSL and the plain-text "Client Random" parameter are sent from the terminal X to the terminal Y (see (1) in FIG. 18). The control information is an SSL version number of the terminal Y, encryption settings, session-unique data, and the like. Then, control information required for the terminal Y to communicate with the terminal X using the SSL and the plain-text "Server Random" parameter are sent from the terminal X to the terminal Y (see (2) in FIG. 18). The control information is an SSL version number of the terminal X, encryption settings, session-unique data, and the like. The terminal Y generates the "PreMaster Secret" of the session using all pieces of data generated through the SSL handshake, and encrypts the "PreMaster Secret" using a public key of the terminal X acquired from the information transmitted from the terminal X. The terminal Y then transmits the encrypted "PreMaster Secret" to the terminal X (see (3) in FIG. 18).

Next, after the establishment of the SSL handshake is recognized and the encrypted packet data, such as the electronic file, is transmitted from the terminal X to the terminal Y, the communication device A and the communication device B collect the encrypted packet data passing through the communication device A. The communication device A and B extract the parameters required to generate the decryption key used when the collected encrypted packet data is decrypted (Step S1801 and S1802).

Specifically, after the establishment of the SSL handshake between the terminal X and the terminal Y is recognized, the communication device A and the communication device B collect the encrypted packet data passing through the communication device A and the communication device B. The communication device A and the communication device B store the collected packet data in the predetermined storage section. The communication device A and the communication device B then extract the "Client Random" parameter, the "Server Random" parameter, and the "PreMaster Secret" parameter required to generate the decryption key used when the collected encrypted packet data is decrypted.

Subsequently, the communication device B notifies the communication device A of the extracted parameters (Step S1806) Specifically, the communication device B notifies the communication device A of the extracted "Client Random" parameter, the "Server Random" parameter, and the "PreMaster Secret" parameter.

The communication device A generates the decryption key using the parameters of which the notification has been given and the secret key held in advance and transmits the generated decryption key to the communication device B (Step S1807). Specifically, the communication device A decrypts the "PreMaster Secret" parameter of which the notification has been given by the communication device B using a server secret key of the terminal X held in advance. The communication device A then generates the decryption key from the information that is the decrypted "PreMaster Secret" parameter, the "Client Random" parameter, and the "Server Random" parameter, in adherence to a calculation formula (refer to Section 6.3 of RFC 2246). The communication device A transmits the generated decryption key to the communication device B.

Next, the communication device B decrypts the collected encrypted packet data using the acquired decryption key (Step S1808). The communication device B then extracts the profile information of the decrypted and analyzed packet data (Step S1810).

Specifically, the communication device B decrypts the collected encrypted packet data using the acquired decryption key and analyzes the decrypted packet data. The communication device B extracts the profile information, such as the "packet data name, level of importance, type, and user information", and stores the extracted profile information in the predetermined storage section as the communication log.

The communication device B transmits the extracted profile information and the network information related to the network through which the encrypted packet data passes to the communication log device as the communication log (Step S1813).

Specifically, the communication device B transmits the extracted profile information, such as the "packet data name, level of importance, type, and user information", and the network information related to the network, such as the "passage time, packet data transmitting source, and packet data transmitting destination", acquired when the packet data passes through the communication device B to the communication log device as the communication log.

The communication log device stores the profile information and the network information transmitted from the communication device B in the predetermined storage section as the communication log (Step S1814). Specifically, the communication log device sequentially stores the profile information, such as the "packet data name, level of importance, type, and user information", and the network information related to the network, such as the "passage time, packet data transmitting source, and packet data transmitting destination", acquired when the packet data passes through the communication device B in the predetermined storage section as the communication log, in order of the passage time.

In the communication device A, the communication device A notifies a controlling section of the communication device A that generates the decryption key of the parameters. The communication device A generates the decryption key and, like the communication device B, extracts the profile information. The communication device A then transmits the extracted profile information and the network information to the communication log device as the communication log. The communication log device stores the profile information and the network information transmitted from the communication device A in the predetermined storage section as the communication log (Step S1803 to Step S1805, Step S1807, Step S1809, Step S1811, and Step S1812).

In this way, according to the fourth embodiment, the communication device holds the secret key of the terminal connected to the communication device. The communication device generates the decryption key using the held secret key and the extracted parameters. The communication device decrypts the collected packet data using the generated decryption key and analyzes the decrypted packet data. The communication device extracts the profile information of the analyzed packet data. The communication device then transmits the extracted profile information and the network information related to the network through which the encrypted packet data passes to the communication log device as the communication log. As a result, because a distribution range of the secret key is limited to specified devices including the terminal and the connected communication device, the cryptographic communication can be safely decrypted.

For example, the communication device holds the secret key of the terminal connected to the communication device, and then generates the decryption key using the held secret key and the extracted parameters. The communication device decrypts the encrypted packet data using the generated decryption key and analyzes the decrypted packet data. The communication device extracts the profile information of the analyzed packet data, and then transmits the extracted profile information and the network information related to the network to the communication log device. As a result, because the distribution range of the secret key is limited to specified devices including the terminal and the connected communication device, the cryptographic communication can be safely decrypted.

According to the first embodiment to the third embodiment, the communication device notifies the key managing device of the parameters and acquires the decryption key generated by the key managing device. However, the present invention is not limited thereto. The decryption key can be generated by the terminal connected to the communication device without the communication device notifying the key managing device of the parameters.

Figure 19:
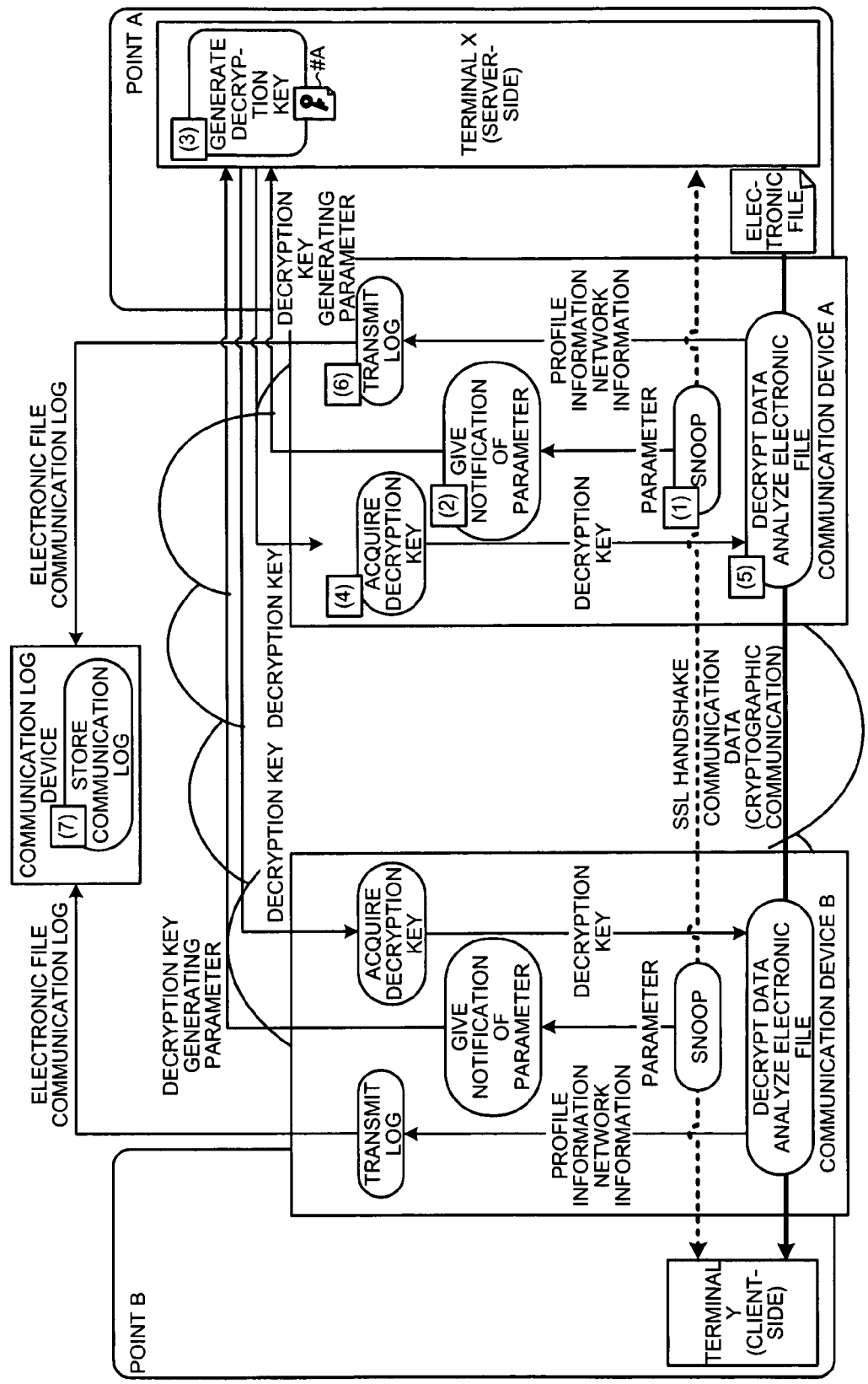
FIG. 19 is a diagram of an overall configuration of a system including a communication device according to a fifth embodiment of the present invention.

In a fifth embodiment, the communication device acquires the decryption key used to decrypt cryptographic communication performed over the network and generated by the terminal connected to the communication device from the terminal. FIG. 19 is a diagram of an overall configuration of a system including a communication device according to the fifth embodiment.

The system including the communication device includes the communication device A, the communication device B, and the communication log device as shown in FIG. 19. The communication device A is connected to the terminal X at the point A. The communication device B is connected to the terminal Y at the point B. The terminal X and the terminal Y are connected such that cryptographic communication can be performed therebetween.

The system of the fifth embodiment differs from those of the first embodiment to the third embodiment in that the terminal connected to the communication device generates the decryption key used when the encrypted packet data is decrypted, instead of the key managing device. According to the fifth embodiment, the communication device A acquires the decryption key.

As described in the first embodiment, when the encrypted packet data, such as the electronic file, is transmitted from the terminal X at the point A to the terminal Y at the point B, the communication device A collects the encrypted packet data passing through the communication device A. The communication device A then extracts parameters required to generate the decryption key used to decrypt the collected packet data (see (1) in FIG. 19).

Then, the communication device A notifies the terminal X of the extracted parameters (see (2) in FIG. 19). The notification is described in detail as follows, using the above-described example. The communication device A notifies the terminal X of the extracted plain-text "Client Random" parameter, the "Server Random" parameter, and the "Pre-Master Secret" parameter encrypted by a public key of the terminal X. The terminal X holds the "secret key #A" of the terminal X at the point A.

The terminal X that receives the notification of the parameters from the communication device A generates the decryption key using the parameters of which the notification has been received and the "secret key #A" (see (3) in FIG. 19). Specifically, in the above-described example, the terminal X decrypts the "PreMaster Secret" parameter of which the notification has been received using the held "secret key #A". The terminal X generates the decryption key from information that is the decrypted "PreMaster Secret" parameter, the "Client Random" parameter, and the "Server Random" parameter, in adherence to a calculation formula (refer to Section 6.3 of RFC 2246).

Next, the communication device A acquires the decryption key, generated by the terminal X using the parameters of which the notification has been received, from the terminal X (see (4) in FIG. 19). Specifically, the communication device A receives the "decryption key #AA" generated by the terminal X using cryptographic communication, such as SSL or IPSec. The "decryption key #AA" is valid only during a session between the communication device A and the terminal X. The "decryption key #AA" becomes invalid when the session ends.

Next, the communication device A decrypts the collected packet data using the acquired decryption key and analyzes the decrypted packet data. The communication device A then extracts the profile information of the analyzed packet data (see (5) in FIG. 19). Specifically, the communication device A decrypts the collected packet data using the "decryption key #AA" received from the terminal X and analyzes the decrypted packet data. The communication device A then extracts the profile information, such as the "packet data name, level of importance, type, and user information".

The communication device A then transmits the extracted profile information and network information related to the network through which the encrypted packet data passes to the communication log device as a communication log. The communication log device stores the transmitted communication log in the predetermined storage section (see (6) and (7) in FIG. 19).

Specifically, the communication device A transmits the extracted profile information, such as the "packet data name, level of importance, type, and user information", and the network information, such as the "packet data transmitting source, packet data transmitting destination, and passage time at which the packet data passes through the communication device A" to the communication log device as the communication log. The above network information is collected when the encrypted packet data passes through the communication device A. The communication log device then stores the profile information and the network information transmitted from the communication device A in the predetermined storage section as the communication log. Like the communication device A, the communication device B notifies the terminal X of the parameters and acquires the decryption key from the terminal X.

Figure 20:
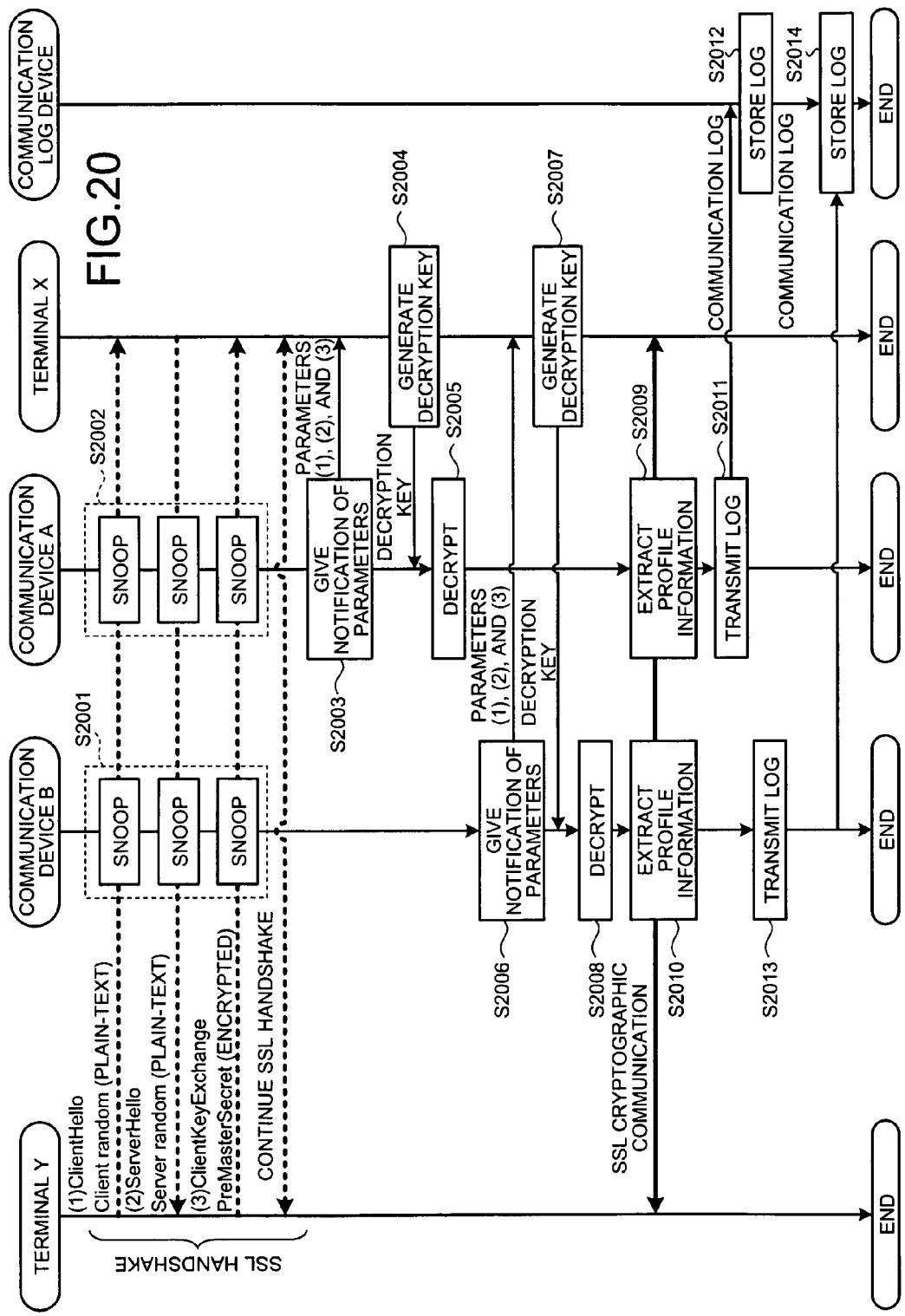
FIG. 20 is a diagram of a control sequence of a communication log transmitting process performed by the overall system including the communication device according to the fifth embodiment.

Next, a control sequence of a communication log transmitting process performed among the terminal Y, the communication device B, the communication device A, the terminal X, and the communication log device shown in FIG. 1 will be described with reference to FIG. 20. FIG. 20 is a diagram of the control sequence of the communication log transmitting process performed by the overall system including the communication device according to the fifth embodiment.

Before the encrypted packet data, such as the electronic file, is transmitted from the terminal X to the terminal Y, the SSL handshake is established so as to exchange control-related information, such as the method and protocol for performing communication between the terminal X and the terminal Y in advance.

A following specific example is given. As a result of the establishment of the SSL handshake, control information required for the terminal X to communicate with the terminal Y using the SSL and the plain-text "Client Random" parameter are sent from the terminal X to the terminal Y (see (1) in FIG. 20). The control information is the SSL version number of the terminal Y, encryption settings, session-unique data, and the like. Then, control information required for the terminal Y to communicate with the terminal X using the SSL and the plain-text "Server Random" parameter are sent from the terminal X to the terminal Y (see (2) in FIG. 20). The control information is the SSL version number of the terminal X, encryption settings, session-unique data, and the like. The terminal Y generates the "PreMaster Secret" of the session using all pieces of data generated through the SSL handshake, and encrypts the "PreMaster Secret" using a public key of the terminal X acquired from the information transmitted from the terminal X. The terminal Y then transmits the encrypted "PreMaster Secret" to the terminal X (see (3) in FIG. 20).

Next, after the establishment of the SSL handshake is recognized and the encrypted packet data, such as the electronic file, is transmitted from the terminal X to the terminal Y, the communication device A and the communication device B collect the encrypted packet data passing through the communication device A. The communication device A and B extract the parameters required to generate the decryption key used when the collected encrypted packet data is decrypted (Step S2001 and S2002).

Specifically, after the establishment of the SSL handshake between the terminal X and the terminal Y is recognized, the communication device A and the communication device B collect the encrypted packet data passing through the communication device A and the communication device B, and then store the collected packet data in the predetermined storage section. The communication device A and the communication device B then extract the "Client Random" parameter, the "Server Random" parameter, and the "PreMaster Secret" parameter required to generate the decryption key used when the collected encrypted packet data is decrypted.

Subsequently, the communication device A notifies the terminal X of the extracted parameters (Step S2003). Specifically, the communication device A notifies the terminal X of the extracted "Client Random" parameter, the "Server Random" parameter, and the "PreMaster Secret" parameter.

The terminal X generates the decryption key using the parameters of which the notification has been given and the held secret key and transmits the generated decryption key to the communication device A (Step S2004). Specifically, the terminal X decrypts the "PreMaster Secret" parameter of which the notification has been given by the communication device A using the held secret key. The terminal X then generates the decryption key from the information that is the decrypted "PreMaster Secret" parameter, the "Client Random" parameter, and the "Server Random" parameter, in adherence to a calculation formula (refer to Section 6.3 of RFC 2246). The terminal X transmits the generated decryption key to the communication device A.

Next, the communication device A decrypts the collected encrypted packet data using the acquired decryption key (Step S2005). The communication device A then extracts the profile information of the decrypted and analyzed packet data (Step S2009).

Specifically, the communication device A decrypts the collected encrypted packet data using the acquired decryption key and analyzes the decrypted packet data. The communication device A extracts the profile information, such as the "packet data name, level of importance, type, and user information", and stores the extracted profile information in the predetermined storage section as the communication log.

The communication device A transmits the extracted profile information and the network information related to the network through which the encrypted packet data passes to the communication log device as the communication log (Step S2011).

Specifically, the communication device A transmits the extracted profile information, such as the "packet data name, level of importance, type, and user information", and the network information related to the network, such as the "passage time, packet data transmitting source, and packet data transmitting destination", acquired when the packet data passes through the communication device A to the communication log device as the communication log.

The communication log device stores the profile information and the network information transmitted from the communication device A in the predetermined storage section as the communication log (Step S2012). Specifically, the communication log device sequentially stores the profile information, such as the "packet data name, level of importance, type, and user information", and the network information related to the network, such as the "passage time, packet data transmitting source, and packet data transmitting destination", acquired when the packet data passes through the communication device A in the predetermined storage section as the communication log, in order of the passage time.

Like the communication device A, the communication device B notifies the terminal X of the parameters and acquires the decryption key from the terminal X. The communication device B transmits the profile information and the network information to the communication log device as the communication log. The communication log device stores the profile information and the network information transmitted from the communication device B in the predetermined storage section as the communication log (Step S2006 to Step S2008, Step S2010, Step S2013, and Step S2014).

In this way, according to the fifth embodiment, the communication device notifies the extracted parameters to a device that is the transmitting source of the packet data. The communication device acquires the decryption key, generated by the device that is the transmitting source of the packet data using the parameters of which the notification has been received, from the device that is the transmitting source of the packet data. The communication device decrypts the collected packet data using the acquired decryption key and analyzes the decrypted packet data. The communication device extracts the profile information of the analyzed packet data. The communication device then transmits the extracted profile information and the network information related to the network through which the encrypted packet data passes to the communication log device as the communication log. As a result, because the secret key is not required to be distributed to devices other than the device originally holding the secret key, the cryptographic communication can be safely decrypted.

For example, the communication device notifies the extracted parameters to a device that is the transmitting source of the packet data. The device that is the transmitting source of the packet data generates the decryption key using the parameters of which the notification has been received and transmits the generated decryption key to the communication device. The communication device receives the decryption key from the device that is the transmitting source of the packet data. The communication device decrypts the packet data and analyzes the decrypted packet data. The communication device extracts the profile information of the analyzed packet data. The communication device then transmits the extracted profile information and the network information related to the network to the communication log device as the communication log. As a result, because the secret key is not required to be distributed to devices other than the device originally holding the secret key, the cryptographic communication can be safely decrypted.

Embodiments of the present invention are described above. In addition to the above-described embodiments, various different embodiments are possible. Different embodiments will be described, classified into configuration of the communication device, system configuration, and program.

According to the above-described third embodiment, each communication device holds the transfer rule and whether the packet data can be transferred is judged using the held transfer rule. However, the present invention is not limited thereto. For example, a transfer rule managing device can hold the transfer rule. Each communication device can acquire the transfer rule from the transfer rule managing device and judge whether the packet data can be transferred.

According to the third embodiment, whether the packet data can be transferred is judged through use of "level of importance" and "type" included in the profile information extracted by the communication device. However, the present invention is not limited thereto. For example, an attribute used to judge whether the packet data can be transferred can be only the "level of importance" or only the "type". Moreover, whether the packet data can be transferred can be judged through use of a combination of "level of importance", "type" and other pieces of profile information. Various transfer rules, such as prohibiting transfer of important data, can also be provided.

Each constituent element of each device shown in the diagrams corresponds to a functional concept. Constituent elements are not necessarily required to be physically configured as shown in the diagrams. In other words, specific aspects of distribution and integration of each device are not limited to those shown in the diagrams. For example, the parameter notifying unit 15c can be substituted with a parameter notifying I/F section. Depending on various loads and usage conditions, all or some of the constituent elements can be functionally or physically distributed or integrated by arbitrary units. All or some of each processing function performed by each device can be actualized by a central processing unit (CPU) or a program analyzed and run by the CPU. All or some of the processing functions can also be performed as hardware through wired logic.

Figure 21:
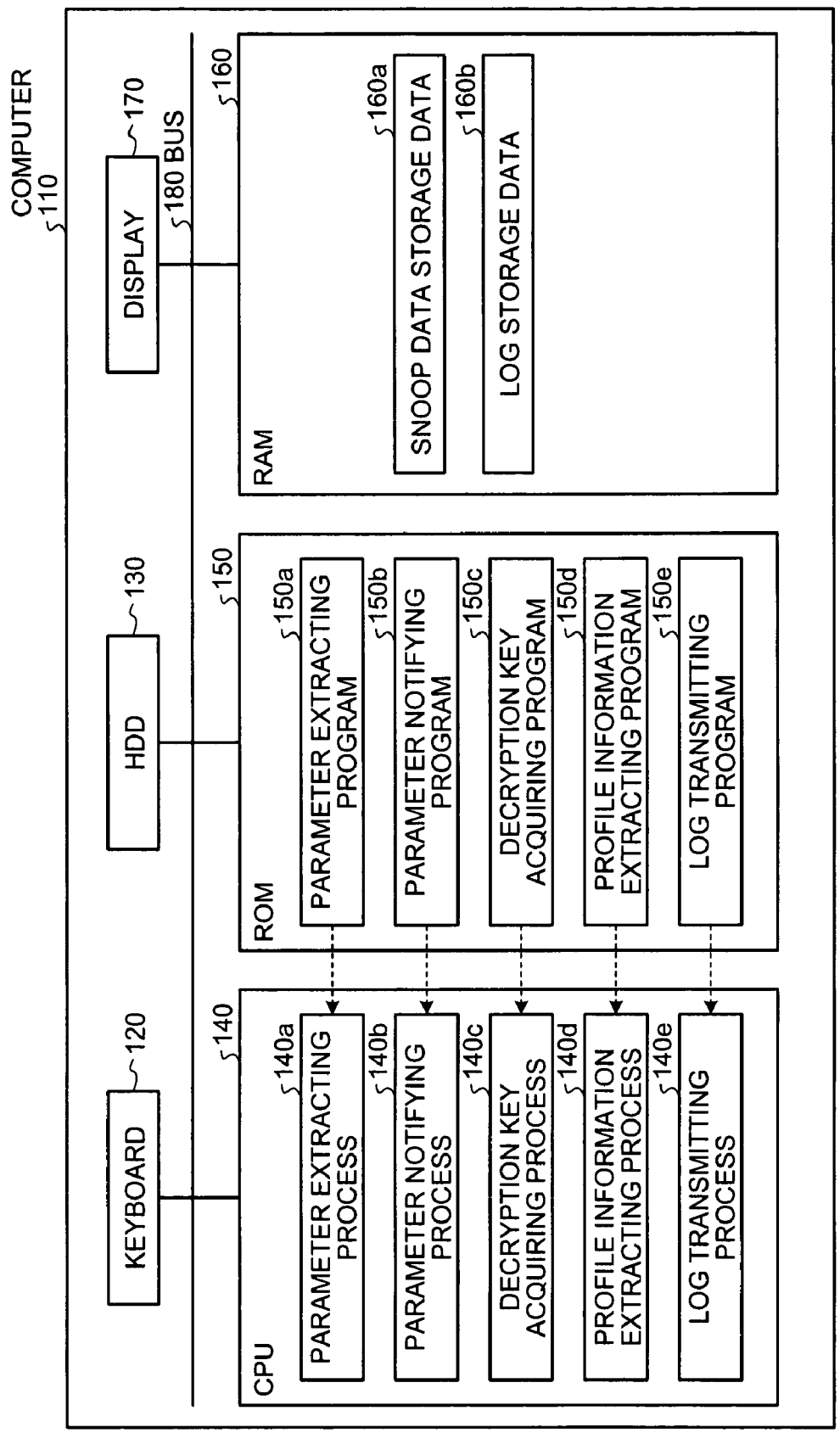
FIG. 21 is a diagram of a computer executing a communication log transmitting program.

According to the above-described embodiments, various processes are performed through hardware logic. However, the present invention is not limited thereto. The processes can be performed through a program that is prepared in advance and run on a computer. An example of a computer running a communication log transmitting program having a same function as the communication device of the embodiments shown in FIG. 19 will be hereafter described with reference to FIG. 21. FIG. 21 is a diagram of a computer running the communication log transmitting program.

A computer 110 serving as a portable terminal includes a keyboard 120, a hard disk drive (HDD) 130, a CPU 140, a read-only memory (ROM) 150, a random-access memory (RAM) 160, and a display 170. The keyboard 120, the HDD 130, the CPU 140, the read-only memory ROM 150, the RAM 160, and the display 170 are connected via a bus 180.

The ROM 150 stores communication log transmitting programs in advance. The communication log transmitting programs achieve the same functions as the communication device A 10 according to the first embodiment. In other words, as shown in FIG. 21, the ROM 150 stores a parameter extracting program 150a, a parameter notifying program 150b, a decryption key acquiring program 150c, a profile information extracting program 150d, and a log transmitting program 150e. Like each constituent element in the communication device A shown in FIG. 2, the programs 150a to 150d can be integrated or distributed accordingly.

The CPU 140 reads the programs 150a to 150e stored in the ROM 150 and executes the programs 150a to 150e. As a result, the programs 150a to 150e function as a parameter extracting process 140a, a parameter notifying process 140b, a decryption key acquiring process 140c, a profile information extracting process 140d, and a log transmitting process 140e. The process 140a to process 140e respective correspond to the parameter extracting unit 15b, the parameter notifying unit 15c, the decryption key acquiring unit 15d, the profile information extracting unit 15f, and the log transmitting unit 15g.

The CPU 140 executes the communication log transmitting programs based on snoop data storage data 160a and log storage data 160b stored the RAM 160. The snoop data storage data 160a stored snooped packet data. The log storage data 160b stores the communication logs transmitted to the communication log device.

The programs 150a to 150e are not necessarily required to be stored from the start in the ROM 150. For example, each program can be stored in a "portable physical medium" that is inserted into the computer 110, such as a flexible disk (FD), a compact disk read-only memory (CD-ROM), a digital versatile disc (DVD), a magneto-optical (MO) disk, an integrated circuit (IC) card, a "fixed physical medium", such as a HDD provided within the computer 110 or outside of the computer 110, "another computer (or server)" connected to the computer 110 by, for example, a public line, a local-area network (LAN), a wide-area network (WAN), and the like. The computer 110 can read each program from the "portable physical medium", the "fixed physical medium", "another computer (or server)", and the like and run the program.

In the embodiments of the present invention, the encrypted packet data passing through the communication device is collected. The parameters required to generate the decryption key used when the collected packet data is decrypted are extracted. The key managing device is notified of the extracted parameters. The decryption key, generated by the key managing device using the parameters of which the notification has been given, is acquired from the key managing device. The collected packet data is decrypted through use of the acquired decryption key, and the decrypted packet data is analyzed. The profile information is extracted from the analyzed packet data. The extracted profile information and the network information related to the network through which the encrypted packet information passes are transmitted to the communication log device as the communication log. As a result, logs of cryptographic communication and network information can be safely and accurately collected.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A communication device connected to a communication log device that manages a communication log of packet data transferred over a network and a key managing device that generates a decryption key used to decrypt encrypted packet data, the communication device comprising:
a parameter extracting unit that collects the encrypted packet data passing through the communication device and extracts from the encrypted packet data parameters required to generate the decryption key used when the collected packet data is decrypted;
a parameter notifying unit that notifies the key managing device of the parameters extracted by the parameter extracting unit, the key managing device storing, for each terminal connected to the communication device, a secret key used by the terminal;
a decryption key acquiring unit that acquires from the key managing device the decryption key generated by using both the secret key stored in the key managing device and the parameters given by the parameter notifying unit, the decryption key being generated by the key managing device;
a profile information extracting unit that decrypts the collected packet data using the decryption key acquired by the decryption key acquiring unit, analyzes the decrypted packet data, and extracts profile information of the analyzed packet data; and
a log transmitting unit that transmits the profile information extracted by the profile information extracting unit and network information related to the network through which the encrypted packet data passes to the communication log device as a communication log.

2. A communication device connected to a communication log device that manages a communication log of packet data transferred over a network and a key managing device that generates a decryption key used to decrypt encrypted packet data, the communication device comprising:
a parameter extracting unit that collects the encrypted packet data passing through the communication device and extracts parameters required to generate the decryption key used when the collected packet data is decrypted;
a parameter notifying unit that notifies the key managing device of the parameters extracted by the parameter extracting unit;
a decryption key acquiring unit that acquires the decryption key, generated by the key managing device using the parameters given by the parameter notifying unit, from the key managing device;
a profile information extracting unit that decrypts the collected packet data using the decryption key acquired by the decryption key acquiring unit, analyzes the decrypted packet data, and extracts profile information of the analyzed packet data; and
a log transmitting unit that transmits the profile information extracted by the profile information extracting unit and network information related to the network through which the encrypted packet data passes to the communication log device as a communication log, wherein
the packet data includes an identifier uniformly identifying the packet data,
the communication device further includes a sequence number attaching unit that, when the packet data passes through the communication device, attaches a sequence number that is a passage order by which the packet data passes through the communication device,
the profile information extracting unit extracts profile information including the identifier uniformly identifying the packet data, and
the log transmitting unit transmits the profile information including the identifier extracted by the profile information extracting unit, the network information related to the network through which the encrypted packet data passes, and the sequence number that is the passage order by which the packet data passes through the communication device, attached by the sequence number attaching unit, to the communication log device.

3. The communication device according to claim 1, further comprising:
a transfer rule holding unit that holds a transfer rule indicating whether the packet data can be transferred to a transmitting destination device; and
a transfer judging unit that discards the packet data when the transfer judging unit judges that the packet data cannot be transferred based on the transfer rule held in the transfer rule holding unit and transfers the packet data when the transfer judging unit judges that the packet data can be transferred based on the transfer rule,
wherein, when the transfer judging unit judges that the packet data cannot be transferred, the log transmitting unit transmits network information including information indicating that the packet data has been discarded and the profile information to the communication log device as the communication log and, when the transfer judging unit judges that the packet data can be transferred, transmits network information including information indicating that the packet data has been transferred and the profile information to the communication log device as the communication log.

4. The communication device according to claim 1, further comprising:
a secret key holding unit that holds a secret key of a terminal connected to the communication device; and a decryption key generating unit that generates the decryption key using the secret key held by the secret key holding unit and the parameters extracted by the parameter extracting unit,
wherein the profile information extracting unit decrypts the collected packet data using the decryption key generated by the decryption key generating unit, analyzes the decrypted packet data, and extracts the profile information of the analyzed packet data, and
the log transmitting unit transmits the profile information extracted by the profile information extracting unit and the network information related to the network through which the encrypted packet data passes to the communication log device as the communication log.

5. The communication device according to claim 1, wherein
the parameter notifying unit notifies a transmission source of the packet data of the parameters extracted by the parameter extracting unit,
the decryption key acquiring unit acquires a decryption key, generated by the transmission source of the packet data using the parameters given by the parameter notifying unit, from the transmission source of the packet data, the profile information extracting unit decrypts the collected packet data using the decryption key acquired by the decryption key acquiring unit, analyzes the decrypted packet data, and extracts the profile information of the analyzed packet data, and the log transmitting unit transmits the profile information extracted by the profile information extracting unit and the network information related to the network through which the encrypted packet data passes to the communication log device as the communication log.

6. The communication device according to claim 1, wherein the parameter extracting unit collects only the encrypted packet data passing through a predetermined port number of the communication device and extracts parameters required to generate a decryption key used to decrypt the collected packet data, the parameter notifying unit notifies the key managing device holding a secret key of the communication device of the parameters extracted by the parameter extracting unit, the decryption key acquiring unit acquires a decryption key, generated by the key managing device using the parameters given by the parameter notifying unit, from the key managing device, the profile information extracting unit removes a header from the collected packet data and decrypts the packet data using the decryption key acquired by the decryption key acquiring unit, analyzes a packet data type from data information attached to the header, and extracts the profile information from the analyzed packet data, and the log transmitting unit transmits the profile information extracted by the profile information extracting unit and the network information related to the network through which the encrypted packet data passes to the communication log device as the communication log.

7. The communication device according to claim 1, wherein the profile information extracting unit terminates a datagram of the predetermined port number, decrypts the collected packet data using the decryption key acquired from the decryption key acquiring unit, analyzes the decrypted packet data, and extracts the profile information from the analyzed packet data.

8. A method for transmitting a communication log suitable for a communication device connected to a communication log device that manages a communication log of packet data transferred over a network and a key managing device that generates a decryption key used to decrypt encrypted packet data, the method comprising:

collecting the encrypted packet data passing through the communication device;

extracting parameters required to generate the decryption key used when the collected packet data is decrypted;

notifying the key managing device of the extracted parameters, the key managing device storing, for each terminal connected to the communication device, a secret key used by the terminal;

acquiring from the key managing device the decryption key generated by using both the secret key stored in the key managing device and the parameters given by the notifying, the decryption key being generated by the key managing device;

decrypting the collected packet data using the acquired decryption key, analyzing the decrypted packet data;

extracting profile information of the analyzed packet data; and transmitting the extracted profile information and network information related to the network through which the encrypted packet data passes to the communication log device as a communication log.

9. A communication system comprising a communication log device that manages a communication log of packet data transferred over a network and a key managing device that generates a decryption key used to decrypt encrypted packet data, and a communication device that transmits the communication log to the communication log device, wherein the key managing device includes a secret key storing unit that, for each terminal connected to the communication device, stores a secret key used by the terminal; and a decryption key generating and transmitting unit that, when parameters required for generating the decryption key are received from the communication device, acquires the secret key of the terminal connected to the communication device from the secret key storing unit, generates the decryption key required to decrypt the packet data collected by the communication device using the acquired secret key and the received parameters, and transmits the generated decryption key to the communication device, the communication device includes a parameter extracting unit that collects the encrypted packet data passing through the communication device and extracts the parameters from the packet data;

a parameter notifying unit that notifies the key managing device of the parameters extracted by the parameter extracting unit;

a decryption key acquiring unit that acquires the decryption key, generated by the key managing device using the parameters given by the parameter notifying unit, from the key managing device;

a profile information extracting unit that decrypts the collected packet data using the decryption key acquired by the decryption key acquiring unit, analyzes the decrypted packet data, and extracts profile information of the analyzed packet data; and a log transmitting unit that transmits the profile information extracted by the profile information extracting unit and network information related to the network through which the encrypted packet data passes to the communication log device as a communication log, and the communication log device includes a communication log storing unit that receives the communication log from the communication device and stores the communication log in a predetermined storage unit.

* * * * *